(12) United States Patent
Kawabuchi et al.

(10) Patent No.: US 9,203,989 B2
(45) Date of Patent: Dec. 1, 2015

(54) METHOD AND SYSTEM FOR MANAGING IMAGE DATA FOR ELECTRONIC PAPER, IMAGE PROCESSING APPARATUS, AND COMPUTER-READABLE STORAGE MEDIUM FOR COMPUTER PROGRAM

(75) Inventors: Yoichi Kawabuchi, Itami (JP); Junichi Hase, Osaka (JP); Tomonari Yoshimura, Kyoto (JP); Hiroki Tajima, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 835 days.

(21) Appl. No.: 12/883,927

(22) Filed: Sep. 16, 2010

(65) Prior Publication Data
US 2011/0069347 A1 Mar. 24, 2011

(30) Foreign Application Priority Data
Sep. 18, 2009 (JP) .................................. 2009-218119

(51) Int. Cl.
*H04N 1/00* (2006.01)
*G06F 3/147* (2006.01)
*G06F 3/12* (2006.01)

(52) U.S. Cl.
CPC ............ *H04N 1/00347* (2013.01); *G06F 3/147* (2013.01); *G06F 3/1205* (2013.01); *G06F 3/1208* (2013.01); *G06F 3/129* (2013.01);
(Continued)

(58) Field of Classification Search
USPC ........................................................ 345/629
See application file for complete search history.

(56) References Cited

U.S. PATENT DOCUMENTS

2005/0177783 A1* 8/2005 Agrawala et al. .............. 715/512
2006/0282903 A1* 12/2006 Jung et al. ........................ 726/27
(Continued)

FOREIGN PATENT DOCUMENTS

JP 2008-148074 6/2008
JP 2008-271462 11/2008

OTHER PUBLICATIONS

Anderson, Nate. "Putting Pen to E-paper: IRex ILiad Ebook Reader Review." Weblog post. Ars Technica. N. p., Feb. 19, 2008. Web. Jun. 25, 2013. <http://arstechnica.com/gadgets/2008/02/iliad-review/>.*
ILiad User Manual. N.p.: n.p., 2007.*

*Primary Examiner* — Carlos Perromat
*Assistant Examiner* — Vu Nguyen
(74) *Attorney, Agent, or Firm* — Buchanan Ingersoll & Rooney PC

(57) ABSTRACT

An image processing apparatus includes a display state data obtaining portion obtaining display state data indicating a state of a displayed image that is an image electrically displayed on electronic paper, a display termination control portion controlling the electronic paper to finish displaying the displayed image, a write image data obtaining portion that obtains write image data that is image data of a write image corresponding to an image written on the electronic paper by reading the image written on the electronic paper after finishing the display, and a storage control portion that controls a storage portion to store, therein, displayed image data that is image data of the displayed image, the display state data obtained by the display state data obtaining portion, and the write image data obtained by the write image data obtaining portion, the displayed image data, the display state data, and the write image data being associated with one another.

15 Claims, 27 Drawing Sheets

(52) U.S. Cl.
CPC ............ *G06F3/1242* (2013.01); *G06F 3/1265* (2013.01); *G06F 3/1271* (2013.01); *G06F 2206/1512* (2013.01); *G09G 2340/0414* (2013.01); *G09G 2340/0421* (2013.01); *G09G 2340/0471* (2013.01); *G09G 2340/0478* (2013.01); *G09G 2370/16* (2013.01); *G09G 2380/02* (2013.01); *H04N 2201/001* (2013.01)

(56) References Cited

U.S. PATENT DOCUMENTS

| | | | |
|---|---|---|---|
| 2007/0058178 A1* | 3/2007 | Kurihara et al. | 358/1.2 |
| 2008/0137122 A1 | 6/2008 | Eguchi et al. | |
| 2009/0153496 A1* | 6/2009 | Kurihara et al. | 345/173 |
| 2010/0278453 A1* | 11/2010 | King | 382/321 |

* cited by examiner

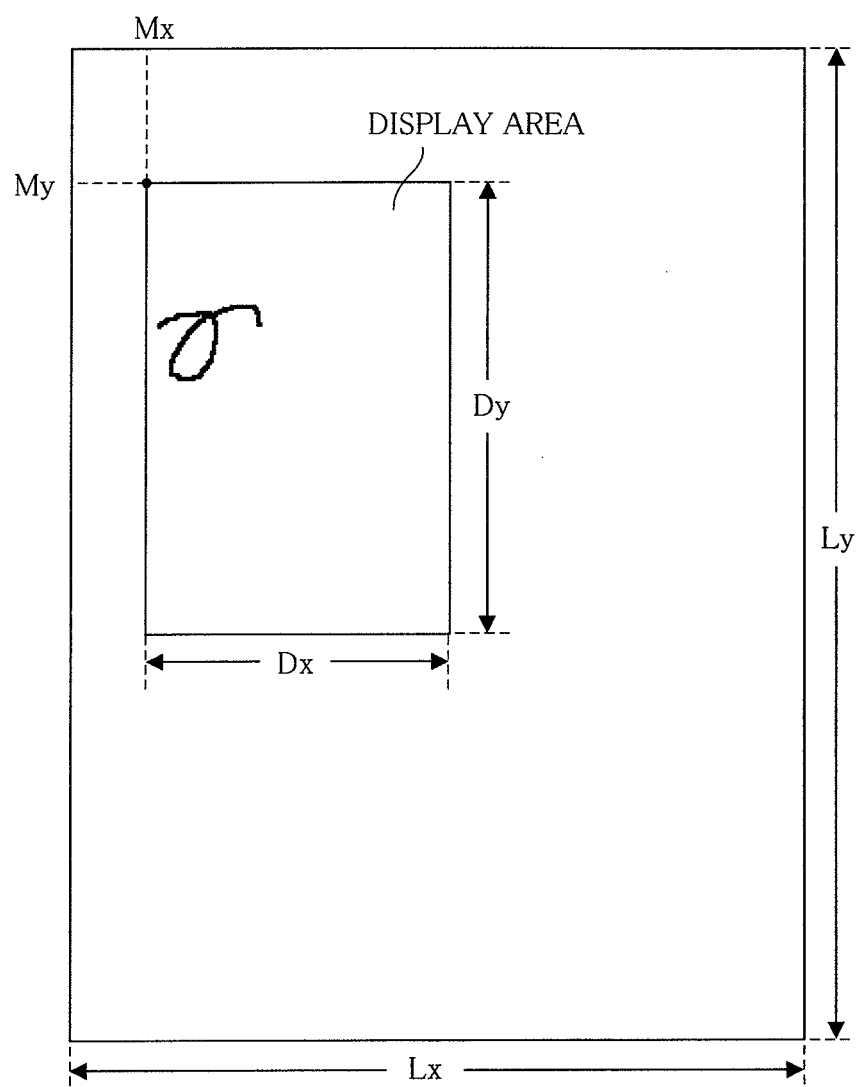

FIG. 25

ORIGINAL DOCUMENT ID: D0001
AUTHORIZED USER ID: U0004,U0008,U0011,U0013

|  |  | PAGE NUMBER | | |
|---|---|---|---|---|
|  |  | 1 | 2 | ... |
| LAYER 1 | LAYER ID | L0011 | L0021 | ... |
|  | USER ID | U0004 | U0011 | ... |
|  | IMAGE ID | G0011 | G0021 | ... |
|  | DISPLAY AREA | (30,30) | (20,50) | ... |
|  | DISPLAY SCALING FACTOR | 120% | 150% | ... |
| LAYER 2 | LAYER ID | L0012 | L0022 | ... |
|  | USER ID | U0008 | U0004 | ... |
|  | IMAGE ID | G0021 | G0022 | ... |
|  | DISPLAY AREA | (120,50) | (20,60) | ... |
|  | DISPLAY SCALING FACTOR | 200% | 180% | ... |
| ⋮ | ⋮ | ⋮ | ⋮ | ⋮ |

METHOD AND SYSTEM FOR MANAGING IMAGE DATA FOR ELECTRONIC PAPER, IMAGE PROCESSING APPARATUS, AND COMPUTER-READABLE STORAGE MEDIUM FOR COMPUTER PROGRAM

This application is based on Japanese patent application No. 2009-218119 filed on Sep. 18, 2009, the contents of which are hereby incorporated by reference.

BACKGROUND OF THE INVENTION

1. Field of the Invention

The present invention relates to a method, a system, and the like for managing data of an image written on electronic paper.

2. Description of the Related Art

Image forming apparatuses having a variety of functions, such as copying, PC printing, scanning, faxing, and file server, have recently come into widespread use. Such image forming apparatuses are sometimes called "multifunction devices", "Multi-Function Peripherals (MFPs)", or the like.

In recent years, electronic paper has been attracting attention. Examples of a method for displaying an image on electronic paper are a microcapsule method, a liquid crystal method, and an electrophoretic method. Electronic paper based on each of the methods has the following features.

The electronic paper is configured to keep displaying images thereon without drawing electricity. As compared with a Cathode Ray Tube (CRT) display, a Liquid Crystal Display (LCD), and the like, the electronic paper has very low power consumption. Further, the electronic paper is configured to display an image by using reflected light as with ordinary paper, which results in the less adverse effect on human eyes than in the CRT display and the LCD. The electronic paper also has characteristics of being thin and flexible like ordinary paper.

Since a display surface of the electronic paper is made of a glass or a film, a user can write a note or the like thereon using a water-based ink pen.

There is proposed a technology to read an image such as a note or a comment written on electronic paper, and to create image data thereof or copy the image on paper (see Japanese Laid-open Patent Publication Nos. 2008-148074 and 2008-271462).

An image written on electronic paper is converted into electronic data, so that the electronic data can be applied in various ways. For example, the electronic data of such an image can be sent to a remote location instantly, or, the electronic data of such a plurality of images can be centrally managed in a small space of a server. However, increasing the range of application of electronic data of such an image offers more convenience to users.

SUMMARY

The present disclosure is directed to solve the problems pointed out above, and therefore, an object of an embodiment of the present invention is to, as compared with conventional technologies, improve the convenience of using data of an image written on electronic paper.

According to an aspect of the present invention, an image processing apparatus having a function to perform communication with electronic paper is provided. The image processing apparatus includes a display state data obtaining portion that obtains display state data from the electronic paper, the display state data indicating a state of a displayed image that is an image electrically displayed on the electronic paper, a display termination control portion that sends, to the electronic paper, a command to request the electronic paper to finish displaying the displayed image, a write image data obtaining portion that obtains write image data that is image data of a write image corresponding to an image written on the electronic paper by reading the image written on the electronic paper after displaying the displayed image has been finished, and a storage control portion that controls a storage portion to store, therein, displayed image data that is image data of the displayed image, the display state data obtained by the display state data obtaining portion, and the write image data obtained by the write image data obtaining portion, the displayed image data, the display state data, and the write image data being associated with one another.

Preferably, the image processing apparatus further includes a composite image generating portion that generates a composite image based on the displayed image data, the write image data, and the display state data, the composite image being an image obtained by overlaying the write image on the displayed image.

Preferably, the display state data obtaining portion may obtain, as the display state data, data indicating a part of the displayed image displayed on the electronic paper, and the composite image generating portion may generate the composite image by overlaying the write image on the part of the displayed image indicated in the display state data.

Preferably, the display state data obtaining portion may obtain, as the display state data, data indicating an enlargement factor of the displayed image displayed on the electronic paper. The composite image generating portion may generate the composite image by adjusting the write image to have a size of a reciprocal multiple of the enlargement factor and overlaying the write image thus adjusted on the displayed image.

Preferably, a plurality of the write images differing from one another may be written on the electronic paper at different periods of time. The write image data obtaining portion may obtain the write image data of the write image for each of the periods of time. The storage control portion may control the storage portion to store, therein, the write image data of the write image for each of the periods of time. The composite image generating portion may generate the composite image by overlaying at least one of the plurality of the write images on the displayed image.

Preferably, each of the plurality of the write images may be written while the electronic paper displays, thereon, parts of the displayed image differing from one another. The display state data obtaining portion may obtain the display state data for the displayed image displayed on the electronic paper at a time when the write image is written. The display termination control portion may send the command every time the write image is written.

Preferably, the composite image generating portion may generate the composite image by overlaying, on the displayed image, the write image written by a user belonging to a specific group.

These and other characteristics and objects of the present invention will become more apparent by the following descriptions of preferred embodiments with reference to drawings.

BRIEF DESCRIPTION OF THE DRAWINGS

FIGS. 10A and 10B are diagrams illustrating examples of the relationship between an original document and a display area of electronic paper.

FIG. 25 is a diagram illustrating an example of a table storing data for added contents.

DESCRIPTION OF THE PREFERRED EMBODIMENTS

Figure 1:
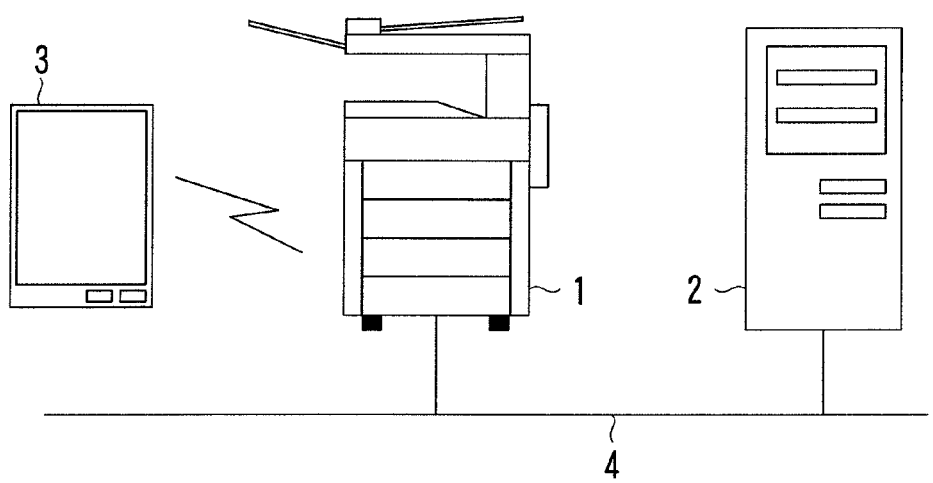
FIG. 1 is a diagram illustrating an example of the overall configuration of a network system.
Figure 2:
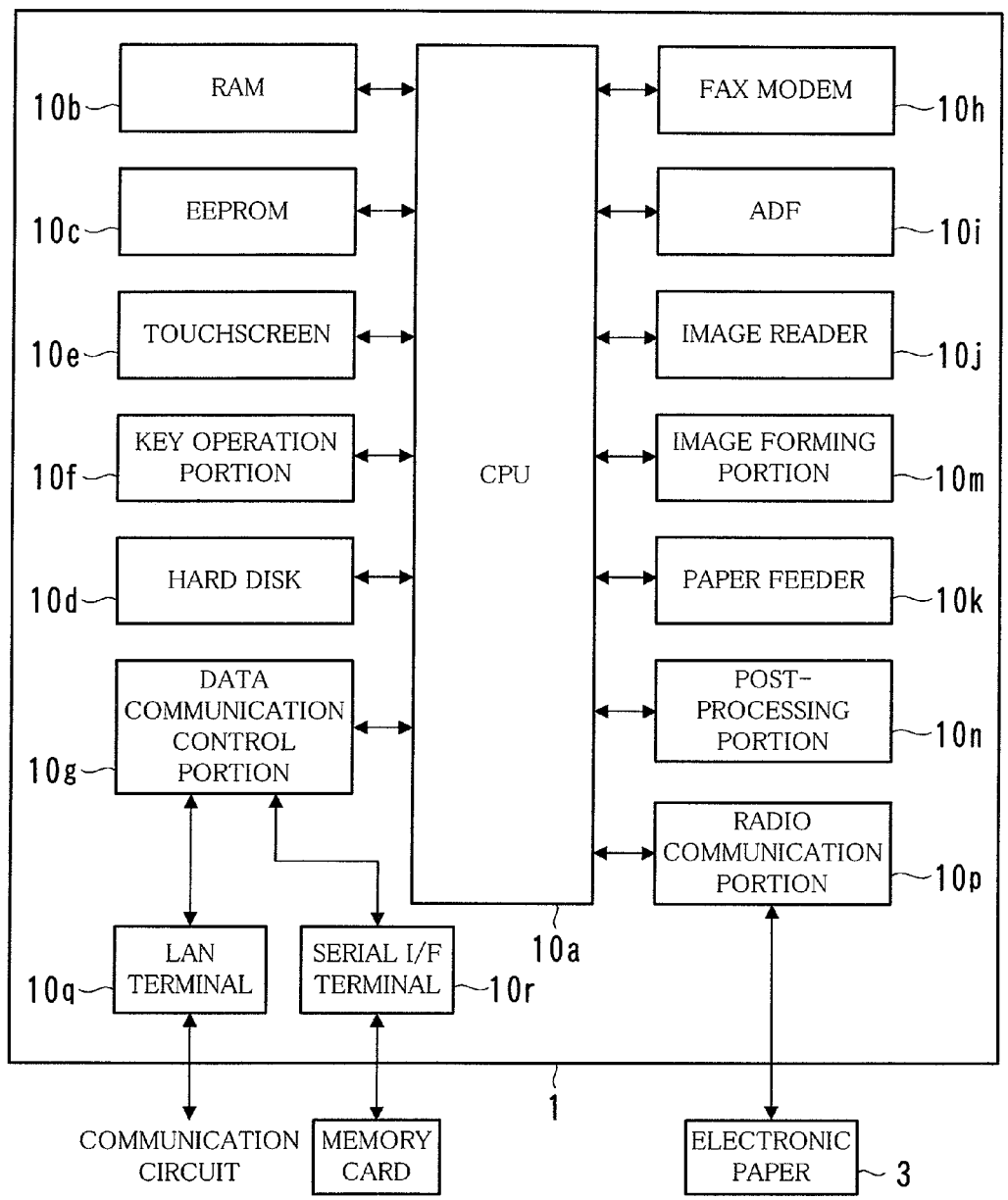
FIG. 2 is a diagram illustrating an example of the hardware configuration of an image forming apparatus.
Figure 3:
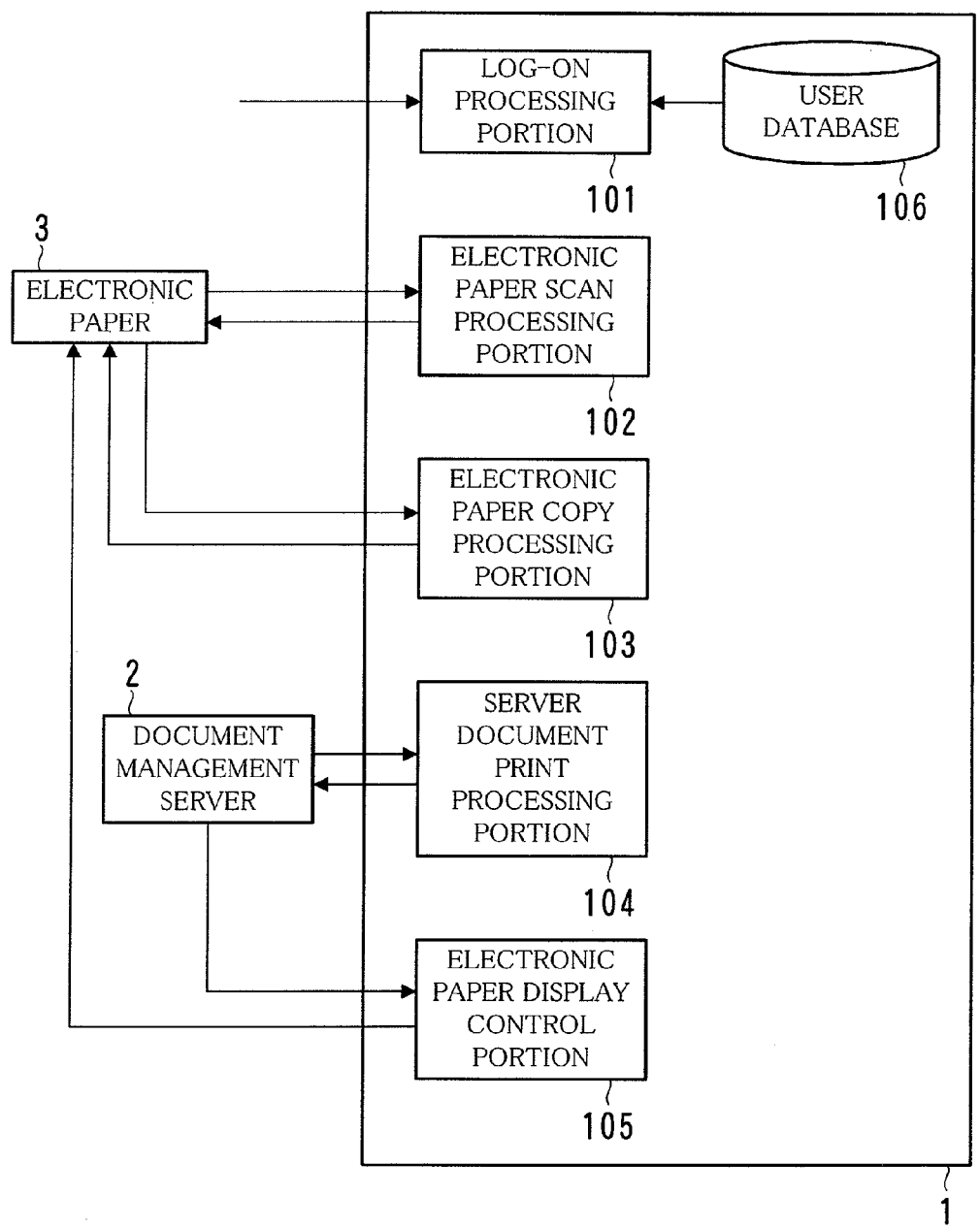
FIG. 3 is a diagram illustrating an example of the functional configuration of an image forming apparatus.
Figure 4:
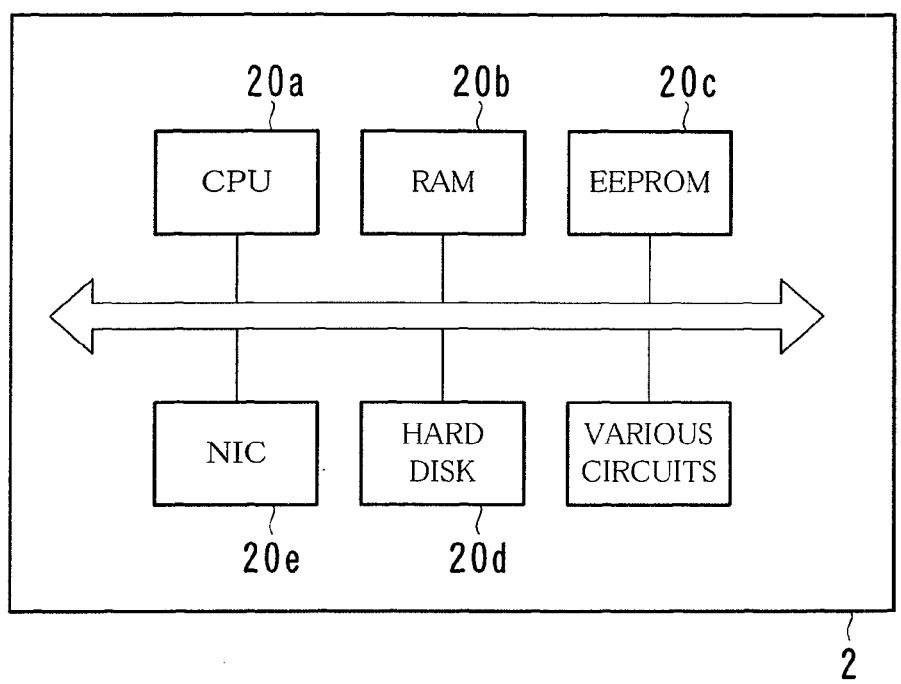
FIG. 4 is a diagram illustrating an example of the hardware configuration of a document management server.
Figure 5:
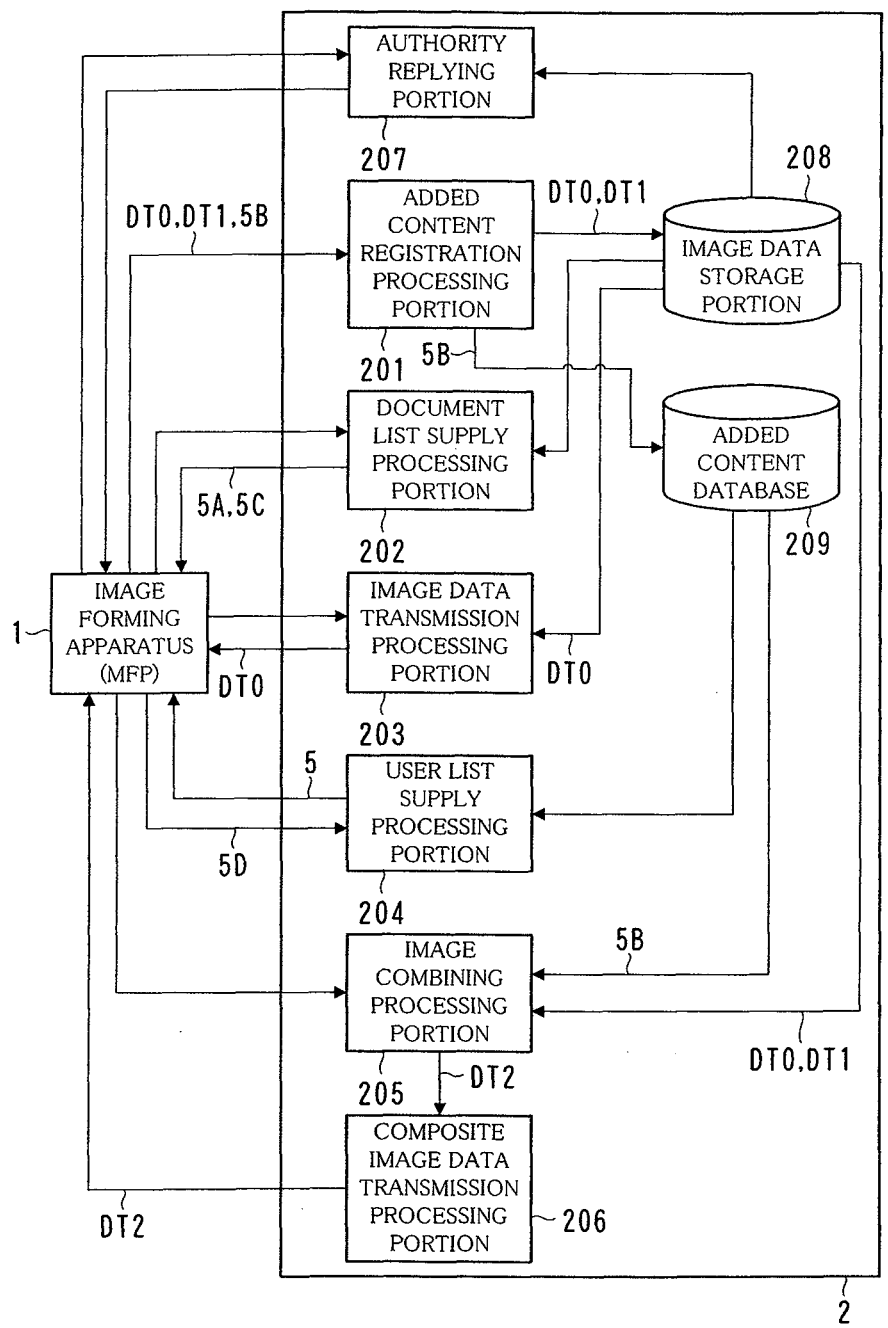
FIG. 5 is a diagram illustrating an example of the functional configuration of a document management server.
Figure 6:
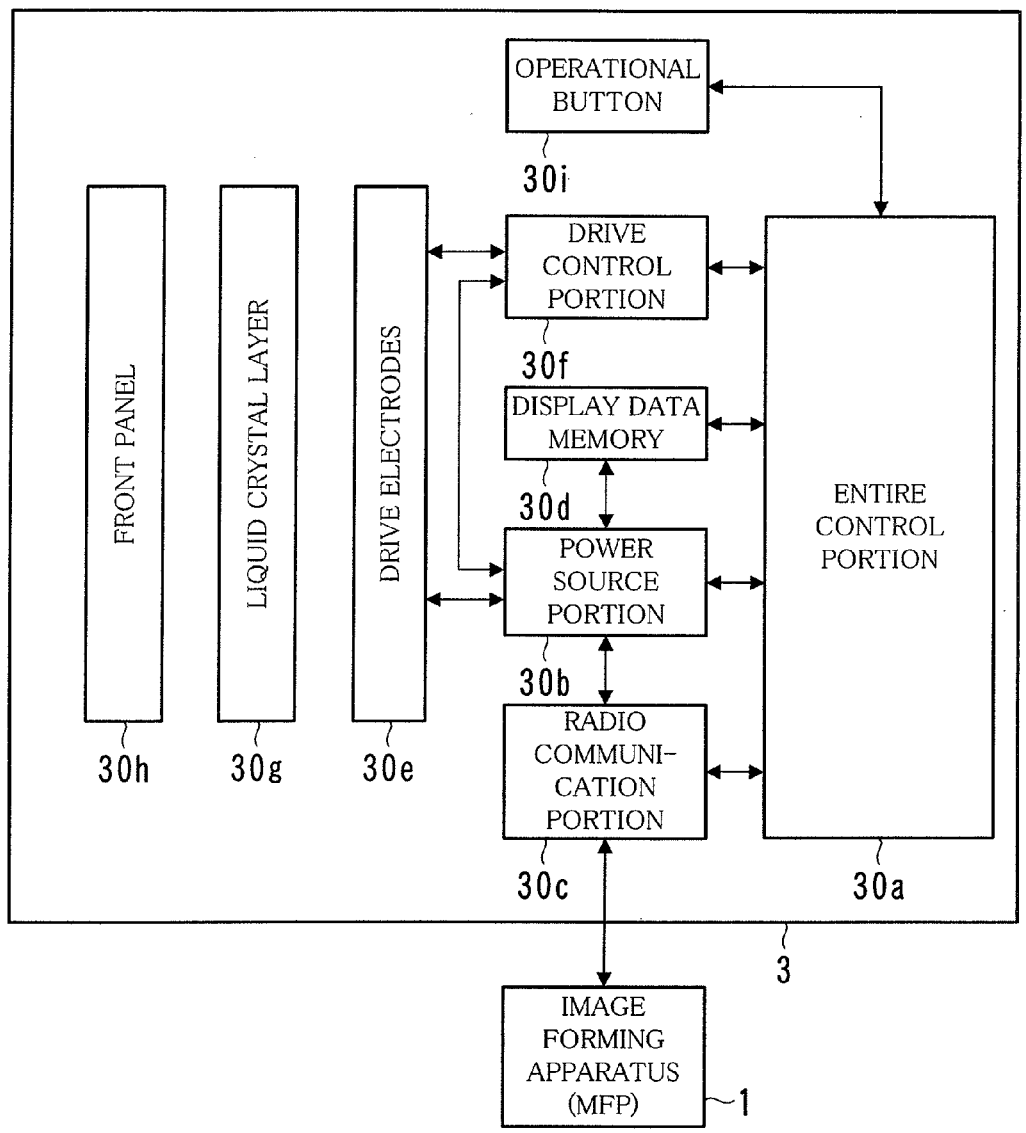
FIG. 6 is a diagram illustrating an example of the hardware configuration of electronic paper.
Figure 7:
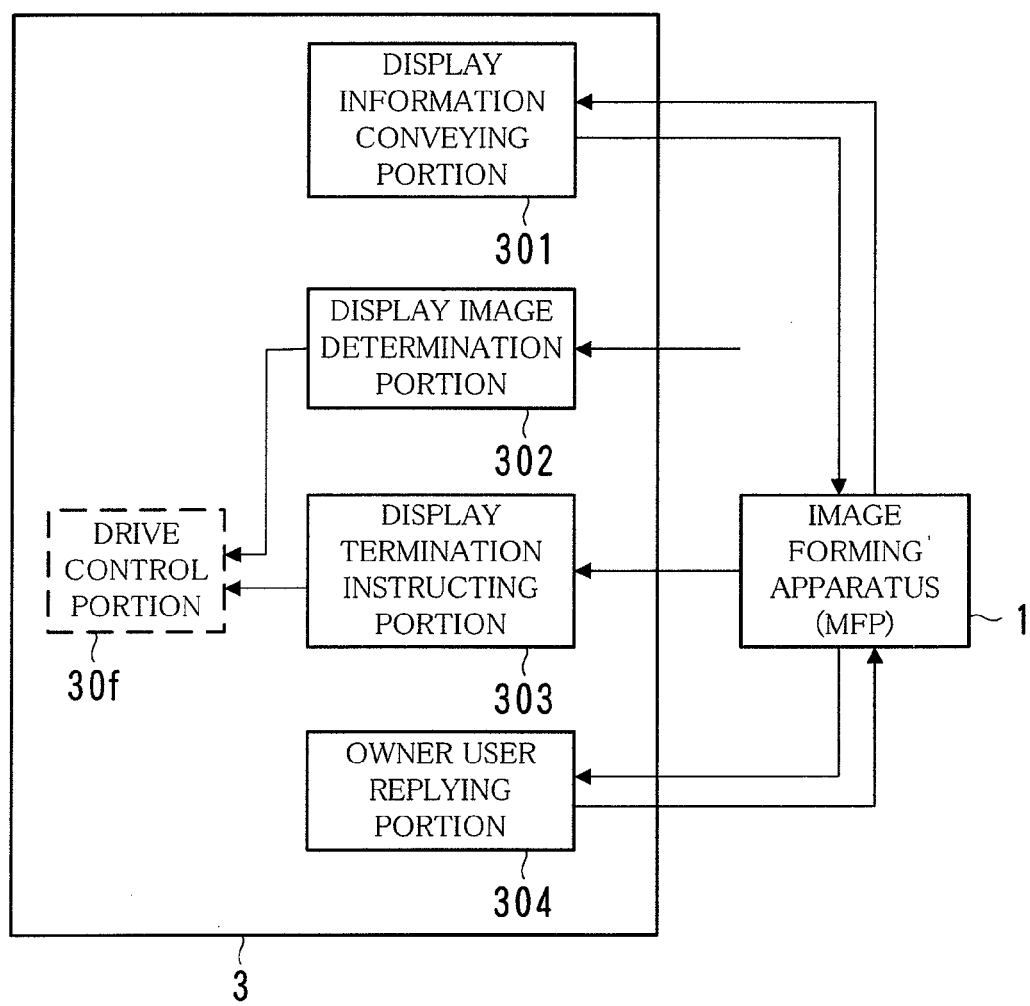
FIG. 7 is a diagram illustrating an example of the functional configuration of electronic paper.

FIG. 1 is a diagram illustrating an example of the overall configuration of a network system NS; FIG. 2 is a diagram illustrating an example of the hardware configuration of an image forming apparatus 1; FIG. 3 is a diagram illustrating an example of the functional configuration of the image forming apparatus 1; FIG. 4 is a diagram illustrating an example of the hardware configuration of a document management server 2; FIG. 5 is a diagram illustrating an example of the functional configuration of the document management server 2; FIG. 6 is a diagram illustrating an example of the hardware configuration of electronic paper 3; and FIG. 7 is a diagram illustrating an example of the functional configuration of the electronic paper 3.

Referring to FIG. 1, the network system NS is configured of the image forming apparatus 1, the document management server 2, the electronic paper 3, a communication line 4, and so on. The image forming apparatus 1 and the document management server 2 are connectable to each other via the communication line 4. Examples of the communication line 4 are a public line, a dedicated line, the Internet, and a so-called Local Area Network (LAN).

The network system NS is installed in organizations such as business offices or public offices, and is used by members belonging to such an organization. The following is a description of an example in which the network system NS is used in an X-company. An employee of the X-company is hereinafter referred to as a "user". Each user is given a unique Identification (ID).

The image forming apparatus 1 is an image processing apparatus generally called a multifunction device or a Multi Function Peripheral (MFP). The image forming apparatus 1 is a device that integrates a variety of functions, such as copying, PC printing (network printing), faxing, scanning, and so on, into a single unit.

The image forming apparatus 1 is further provided with an interface for communication with the electronic paper 3; thereby to display, on the electronic paper 3, data of an image obtained by scanning the image on paper, or to obtain data from the electronic paper 3.

Referring to FIG. 2, the image forming apparatus 1 is configured of a Central Processing Unit (CPU) 10a, a Random Access Memory (RAM) 10b, an Electrically Erasable and Programmable ROM (EEPROM) 10c, a hard disk 10d, a touchscreen 10e, a key operation portion 10f, a data communication control portion 10g, a FAX modem 10h, an Automatic Document Feeder (ADF) 10i, an image reader 10j, a paper feeder 10k, an image forming portion 10m, a post-processing portion 10n, a radio communication portion 10p, a LAN terminal 10q, a serial interface terminal 10r, and so on.

The touchscreen 10e displays, for example, a screen for giving a message to a user, a screen for displaying the result of a process, and a screen for the user to enter a command to be given to the image forming apparatus 1. The touchscreen 10e also detects a position thereof touched (pressed) by the user and informs the CPU 10a of the touched position.

The key operation portion 10f is configured of a numeric keypad and keys such as a start key and a stop key. The key operation portion 10f is used for the user to give a command to the image forming apparatus 1 or to enter data thereinto.

The data communication control portion log is a device for communicating with another device, and is a Network Interface Card (NIC), for example. The data communication control portion log performs communication with the document management server 2, or the like according to Transmission Control Protocol/Internet Protocol (TCP/IP) via the communication line 4. Further, a Universal Serial Bus (USB) interface board is also used as the data communication control portion log in order to perform communication with a device compatible with USB standards, i.e., a so-called USB device.

A twisted pair cable constituting a part of the communication line 4 is connected to the LAN terminal 10q. Thereby, the data communication control portion log is connected to the document management server 2. A USB cable is connected to the serial interface terminal 10r. Thereby, the data communication control portion log is connected to a USB device.

The FAX modem 10h is a device for performing communication with another facsimile terminal via a fixed-line telephone network based on a protocol such as G3.

The ADF 10i is a device to feed each sheet of paper placed thereon to the image reader 10j.

The image reader 10j is a scanner to read images printed on paper supplied by the ADF 10i or directly placed on the subject image reader 10j, i.e., images such as photographs, characters, drawings, diagrams, and the like, and create image data thereof.

The paper feeder 10k serves to feed, to the image forming portion 10m, a blank sheet of paper onto which an image is to be printed.

The image forming portion 10m is a printer to print, onto paper fed by the paper feeder 10k, an image obtained by scanning with the image reader 10j or an image included in image data received from another device.

The post-processing portion 10n is a device to apply a finish to paper onto which the image forming portion 10m has printed an image, i.e., a printed matter. The post-processing portion 10n serves to staple a printed matter, punch a hole therein, or fold a printed matter in three.

The radio communication portion 10p is a device to perform communication with the electronic paper 3 based on radio communication standards. This embodiment describes an example in which the electronic paper 3 is electronic paper using Bluetooth. Accordingly, the radio communication portion 10p is a device performing radio communication based on the Bluetooth. Alternatively, the image forming apparatus 1 may be connected to the electronic paper 3 by using an interface according to other existing standards such as a Universal Serial Bus (USB) or a wireless LAN, or an interface exclusively for electronic paper.

Referring to FIG. 3, the EEPROM 10c or the hard disk 10d stores programs and data for implementing functions of a log-on processing portion 101, an electronic paper scan processing portion 102, an electronic paper copy processing portion 103, a server document print processing portion 104, an electronic paper display control portion 105, a user database 106, and the like. These programs are loaded into the RAM 10b as necessary, whereupon the programs are executed by the CPU 10a.

The whole or a part of the functions of the individual portions illustrated in FIG. 3, and the like may be implemented merely by hardware such as a circuit.

Referring back to FIG. 1, the document management server 2 centrally manages electronic data of documents used in the X-company.

Referring to FIG. 4, the document management server 2 is configured of a CPU 20a, a RAM 20b, an EEPROM 20c, a hard disk 20d, a NIC 20e, a variety of circuits, and so on.

Referring to FIG. 5, the EEPROM 20c or the hard disk 20d stores programs and data for implementing functions of an added content registration processing portion 201, a document list supply processing portion 202, an image data transmission processing portion 203, a user list supply processing portion 204, an image combining processing portion 205, a composite image data transmission processing portion 206, an authority replying portion 207, an image data storage portion 208, an added content database 209, and the like. These programs are loaded into the RAM 20b as necessary, whereupon the programs are executed by the CPU 20a.

The whole or a part of the functions of the individual portions illustrated in FIG. 5, and the like may be implemented merely by hardware such as a circuit.

Referring to FIG. 6, the electronic paper 3 of FIG. 1 is configured of an entirety control portion 30a, a power source portion 30b, a radio communication portion 30c, a display data memory 30d, drive electrodes 30e, a drive control portion 30f, a liquid crystal layer 30g, a front panel 30h, an operational button 30i, and the like.

The entirety control portion 30a serves to control the entire electronic paper 3. The entirety control portion 30a also executes programs described later. A CPU or the like is used as the entirety control portion 30a. The power source portion 30b serves to supply power to the individual portions of the electronic paper 3.

The radio communication portion 30c performs communication with the image forming apparatus 1 based on the Bluetooth standards.

The display data memory 30d stores, therein, image data sent from the image forming apparatus 1, information on display of an image, and the like. The display data memory 30d also stores, therein, a user ID of a user who is the owner of the electronic paper 3. Other than those just mentioned, the display data memory 30d further stores, therein, programs and data for implementing functions of a display information conveying portion 301, a display image determination portion 302, a display termination instructing portion 303, an owner user replying portion 304, and the like. The whole or a part of the functions of the individual portions illustrated in FIG. 7, and the like may be implemented merely by hardware such as a circuit.

The liquid crystal layer 30g is a layer of liquid crystal molecules of individual colors of Red, Green, and Blue (RGB). The orientation of the liquid crystal molecules of the liquid crystal layer 30g is determined by the drive electrodes 30e. Thereby, an image is formed.

The drive control portion 30f controls the drive electrodes 30e in such a manner that an image is formed in accordance with instructions from the entirety control portion 30a.

The front panel 30h is a transparent film or glass plate that covers the front surface of the electronic paper 3. A user can write a note or a comment by hand with a water-based ink pen on the front panel 30h.

The operational button 30i is used for a user to give a command to the electronic paper 3. In particular, the operational button 30i is used in order to change the scaling factor for display and to scroll on the display.

In this embodiment, liquid crystal-type electronic paper is used as the electronic paper 3. Instead, however, other types of electronic paper, such as microcapsule-type electronic paper or electrophoresis-type electronic paper may be used as the electronic paper 3.

Next, the details of processing performed by the individual portions of the image forming apparatus 1, the document management server 2, and the electronic paper 3 are described in order below.

[Preparation of Image Data of an Original Document]

Referring to FIG. 5, the image data storage portion 208 stores, therein, image data used for reproducing a document containing images such as photographs, characters, drawings, and diagrams. As described earlier, a user can write a note or a comment in a document displayed on the electronic paper 3 with a water-based ink pen.

Hereinafter, a document prior to writing a note or a comment therein is referred to as an "original document". A note, a comment, or the like that has been written in the original document is referred to as an "added content". A description is given of an example in which one document has only one page.

Data DT0 of the original document is generated, for example, in the following manner, and is stored in the image data storage portion 208.

The user causes the image forming apparatus 1 to perform a process of scanning paper on which the original document data is depicted and generating image data in a specific format, e.g., Portable Document Format (PDF) or Tagged Image File Format (TIFF). The user, then, causes the image forming apparatus 1 to perform a process of specifying an original document ID for distinguishing the image data and the original document from other image data and other original documents, and transferring the image data to the document management server 2. The original document ID is, for example, a file name of the image data. It is desirable for the image forming apparatus 1 to specify an original document ID in such a manner that the user can easily understand the details of the corresponding original document.

Alternatively, the user creates an original document using an application such as word processing software or drawing software, and sends image data of the original document to the document management server 2. At this time, the user specifies an original document ID of the image data.

With the document management server 2, the image data storage portion 208 associates the image data sent from the image forming apparatus 1 or the like with the specified original document ID, and stores the same as image data DT0 in the subject image data storage portion 208.

The image data storage portion 208 may store, therein, as the image data DT0, data stored in a CD-ROM or data publicized in a Web server on the Internet.

The user can specify a person to be authorized to use the original document, and store the image data DT0 in the image data storage portion 208. In such a case, when storing the image data DT0 in the image data storage portion 208, the user specifies a user ID of the person to be authorized to use the original document. Responding to this operation, the image data storage portion 208 associates the image data DT0 with the user ID specified as an authorized user ID, and stores the same therein.

The image data storage portion 208 also stores image data of an added content therein. The process for storing image data of an added content in the image data storage portion 208 is described later.

[Process for a User to Log onto the Image Forming Apparatus 1]

A user is required to log onto the image forming apparatus 1 prior to beginning to use the same.

Referring to FIG. 3, the user database 106 of the image forming apparatus 1 stores in advance, therein, a user ID and a password for each user.

The log-on processing portion 101 performs a process for the user to log onto the image forming apparatus 1 in the following manner.

When the user operates the touchscreen 10*e* or the like to enter a predetermined command, the log-on processing portion 101 displays a log-on screen on the touchscreen 10*e*. The user enters his/her user ID and password on the log-on screen. Responding to this, the log-on processing portion 101 compares the user ID and password thus entered with each set of a user ID and a password stored in the user database 106. If a match is found between the entered user ID and password and any set of a user ID and a password stored, then the log-on processing portion 101 allows the user to log onto the image forming apparatus 1. This enables the user to use the image forming apparatus 1 within the authority granted to him/her. The user who has logged onto the image forming apparatus 1 is hereinafter referred to as a "log-on user".

[Process for Displaying an Original Document on the Electronic Paper 3]

Figure 8:
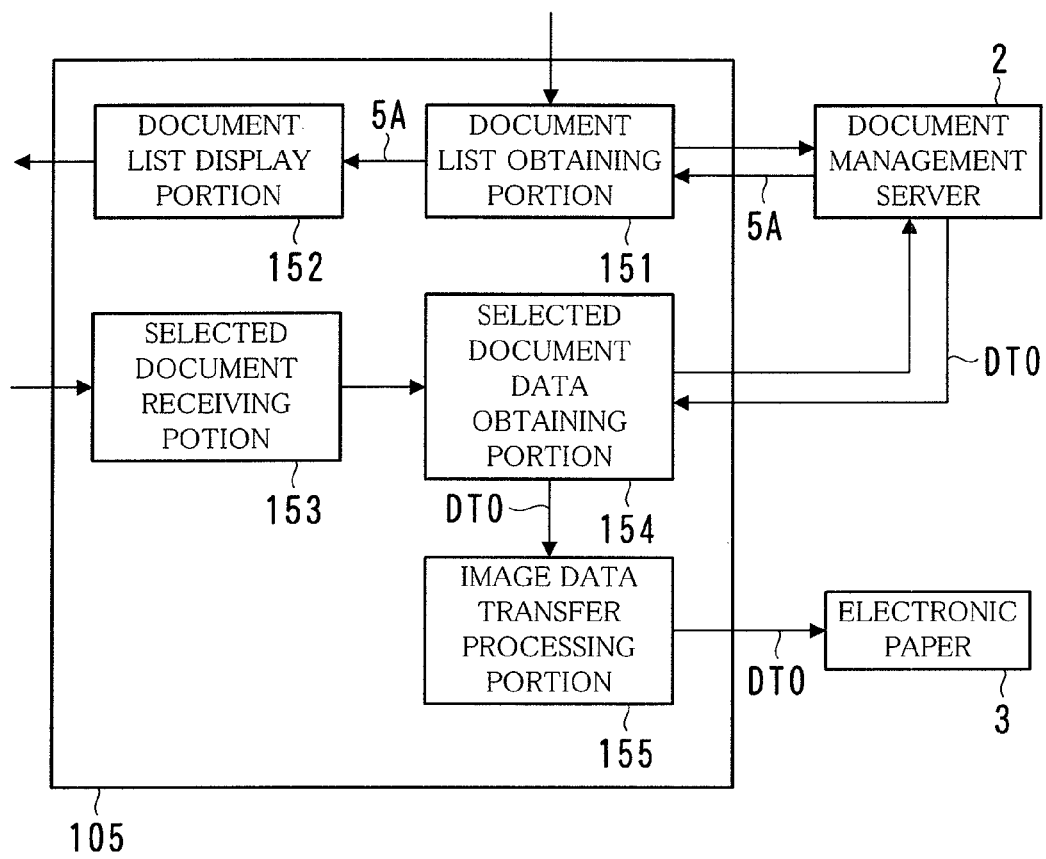
FIG. 8 is a diagram illustrating an example of the configuration of an electronic paper display control portion.
Figure 9:
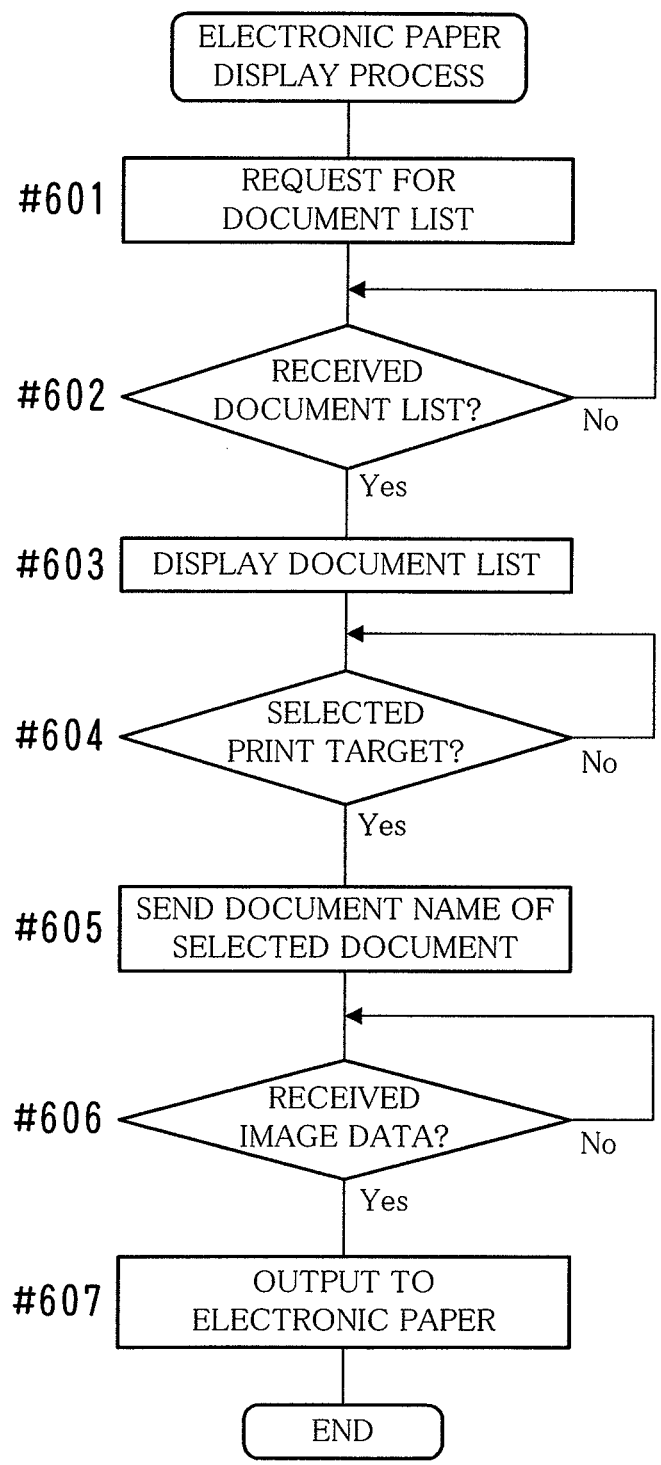
FIG. 9 is a flowchart depicting an example of the flow of an electronic paper display process.
Figure 10A:
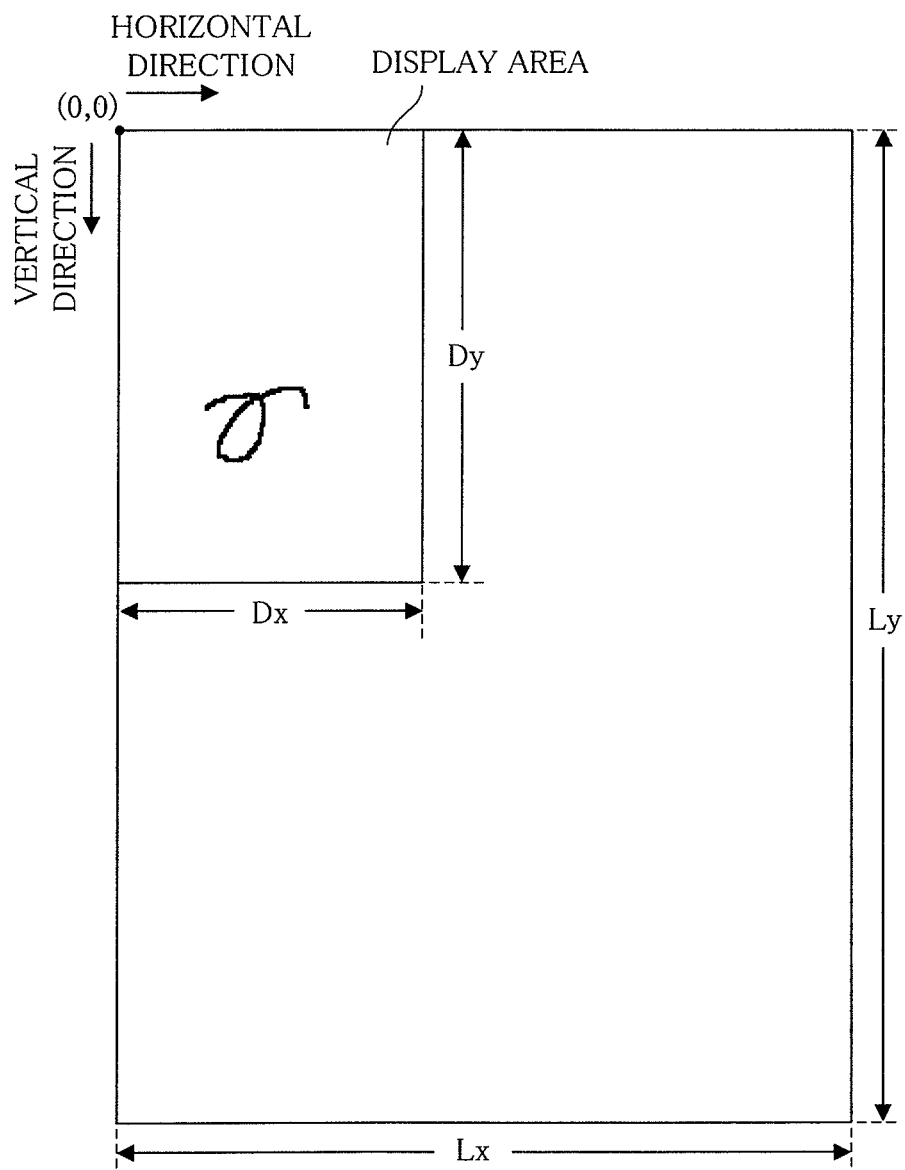

FIG. 8 is a diagram illustrating an example of the configuration of the electronic paper display control portion 105; FIG. 9 is a flowchart depicting an example of the flow of an electronic paper display process; and FIGS. 10A and 10B are diagrams illustrating examples of the relationship between an original document and a display area of the electronic paper 3.

The user can browse, on the electronic paper 3, an original document corresponding to image data DT0 registered in the image forming apparatus 1. The process for displaying the original document on the electronic paper 3 is performed mainly by the electronic paper display control portion 105 (see FIG. 3) of the image forming apparatus 1, the document list supply processing portion 202, and the image data transmission processing portion 203 (see FIG. 5) of the document management server 2, and the like.

The user places, in advance, the electronic paper 3 around the image forming apparatus 1. To be specific, the user places the electronic paper 3 at a position where communication to the image forming apparatus is possible.

Referring to FIG. 8, the electronic paper display control portion 105 is configured of a document list obtaining portion 151, a document list display portion 152, a selected document receiving potion 153, a selected document data obtaining portion 154, an image data transfer processing portion 155, and the like. The individual portions of the electronic paper display control portion 105 perform processes according to the steps shown in FIG. 9. The CPU executes programs, and thereby, processes depicted in the flowchart of FIG. 9, flowcharts, and sequence diagrams discussed later in due order can be implemented.

When a log-on user enters a predetermined command, the document list obtaining portion 151 requests the document management server 2 for a list of original documents, and obtains the same (#601, and Yes in #602 of FIG. 9). At this time, the document list obtaining portion 151 informs the document management server 2 of the user ID of the log-on user.

Responding to this operation, the document list supply processing portion 202 of the document management server 2 searches for image data DT0 with which the informed user ID is associated as an authorized user ID in the image data storage portion 208. Then, the document list supply processing portion 202 sends, to the image forming apparatus 1, document list data 5A containing the original document ID for the image data DT0 found by the search.

When the document list data 5A is received (Yes in #602), the document list display portion 152 displays, on the touchscreen 10*e*, a list of original document IDs included in the document list data 5A (#603).

The user selects an original document ID of an original document that he/she desires to browse on the electronic paper 3 from among the displayed list of original document IDs.

Upon the selection (Yes in #604), the selected document receiving potion 153 receives the original document ID selected by the user. Then, the selected document data obtaining portion 154 requests the document management server 2 for image data DT0 corresponding to the selected original document ID, and obtains the image data DT0 (#605, and Yes in #606). At this time, the selected document data obtaining portion 154 conveys the selected original document ID to the document management server 2.

The image data transmission processing portion 203 of the document management server 2 searches for image data Dt0 corresponding to the conveyed original document ID in the image data storage portion 208. The image data transmission processing portion 203, then, sends the image data DT0 found by the search to the image forming apparatus 1.

When the selected document data obtaining portion 154 receives the image data DT0 (Yes in #606), the image data transfer processing portion 155 transfers the image data DT0 to the electronic paper 3 through wireless communication (#607).

The electronic paper 3 displays the original document based on the image data DT0 sent from the image data transfer processing portion 155. At this time, the display image determination portion 302 illustrated in FIG. 7 determines a part and the size of the original document to be displayed in accordance with operation through the operational button 30*i* (see FIG. 6) by the user. In short, the display image determination portion 302 determines conditions for displaying the original document. The drive control portion 30*f* controls the drive electrodes 30*e* in such a manner that the original document is displayed in accordance with the determination result of the display image determination portion 302.

The process performed by the display image determination portion 302 is detailed below. The number of dots in the horizontal direction and the number of dots in the vertical direction of the original document corresponding to the image data DT0 are denoted by "Lx" and "Ly", respectively. The number of dots in the horizontal direction and the number of dots in the vertical direction of the display area of the electronic paper 3 are denoted by "Dx" and "Dy", respectively.

When the image data DT0 is received, the display image determination portion 302 sets, as default display conditions, the following: As illustrated in FIG. 10A, an area starting from the coordinates (0, 0) of the original document and ending at the coordinates (Dx, Dy) corresponding to the position obtained by moving from the start point in the horizontal direction by Dx pixels and in the vertical direction by Dy pixels is displayed without changing the scaling factor for display, i.e., at 100% scaling factor.

After that, when the user scrolls on the display to move the indication by Mx dots in the vertical direction and My dots in the horizontal direction, the display image determination portion 302 sets, as new display conditions, the following: As illustrated in FIG. 10B, an area starting from the coordinates (Mx, My) of the original document and ending at the position obtained by moving from the start point in the horizontal direction by Dx pixels and in the vertical direction by Dy pixels is displayed at 100% scaling factor.

Thereafter, when the user specifies P % as the scaling factor for display, the display image determination portion 302 sets, as further new display conditions, the following: An area starting from the coordinates (Mx, My) of the original document and ending at the position obtained by moving from the start point in the horizontal direction by (Dx×100/P) pixels and in the vertical direction by (Dy×100/P) is displayed at P % scaling factor.

[Process for Registering an Added Content]

Figure 11:
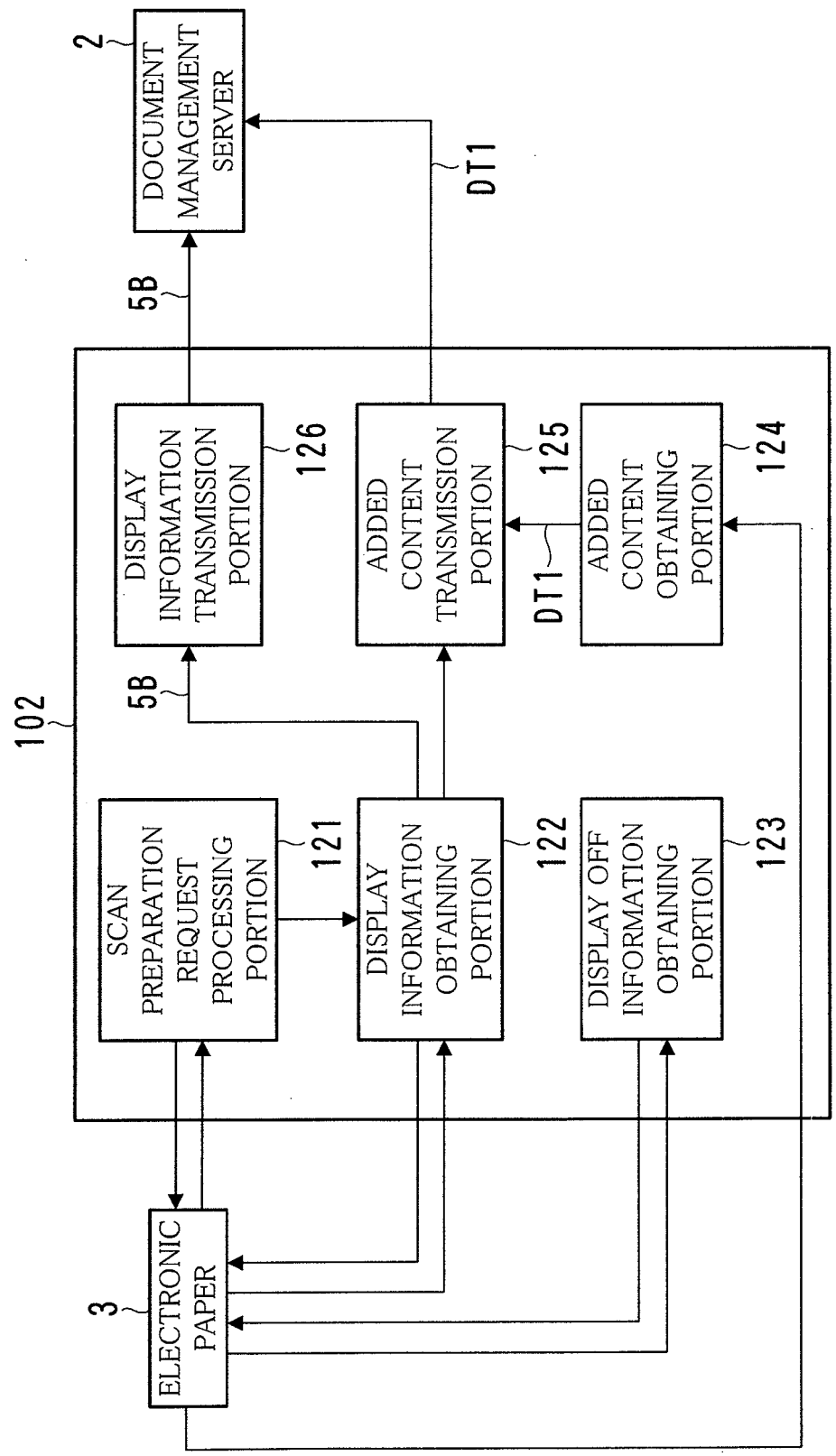
FIG. 11 is a diagram illustrating an example of the configuration of an electronic paper scan processing portion.
Figure 12:
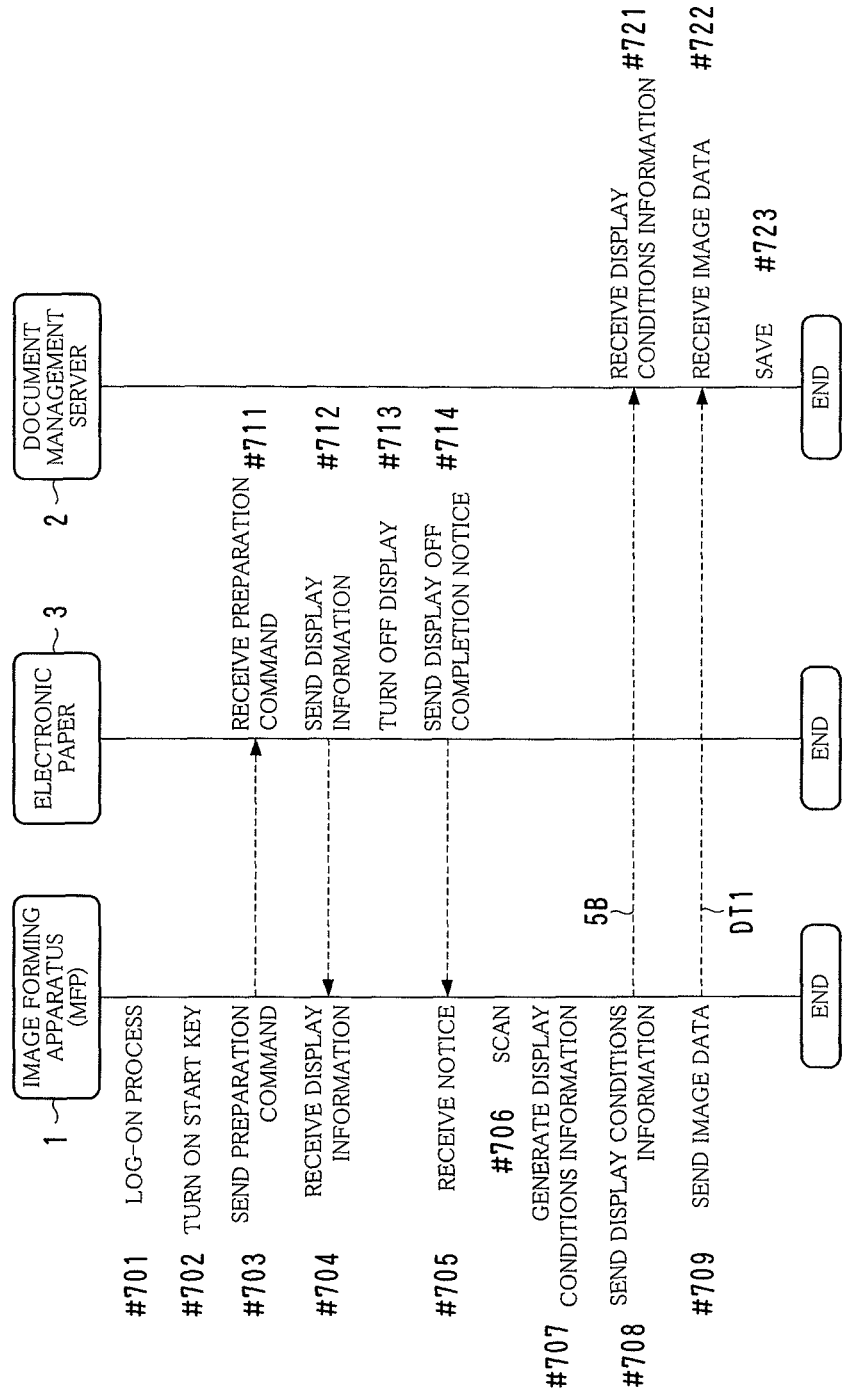
FIG. 12 is a sequence diagram depicting an example of the process steps of individual apparatuses for a case where an added content is registered.
Figure 13A:
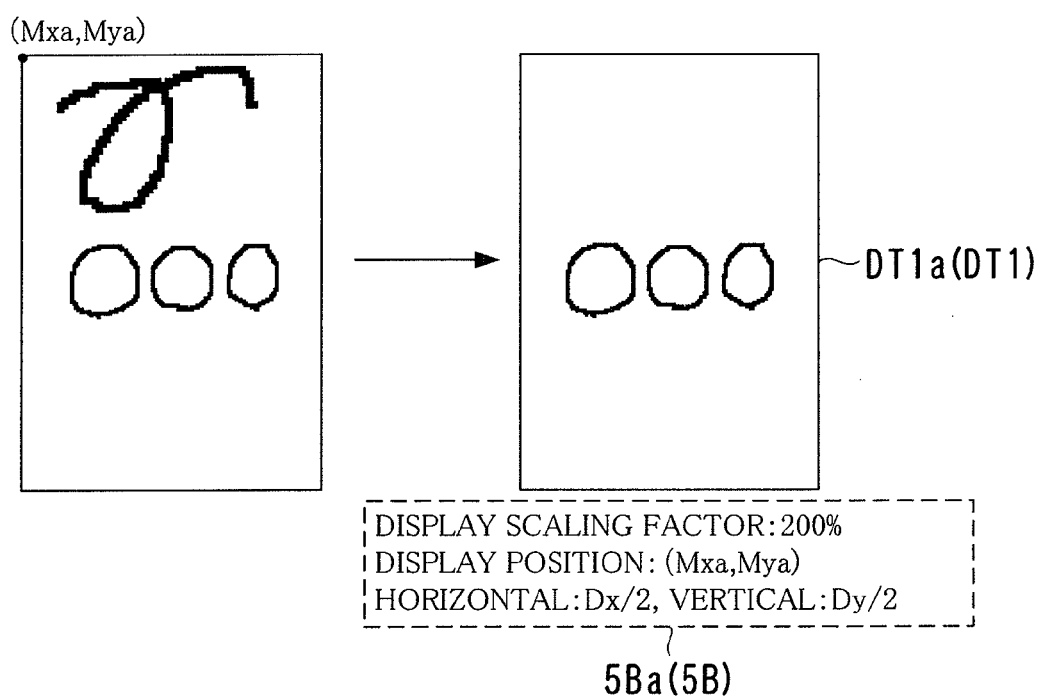
FIGS. 13A and 13B are diagrams illustrating examples of an added content and display conditions data.
Figure 13B:
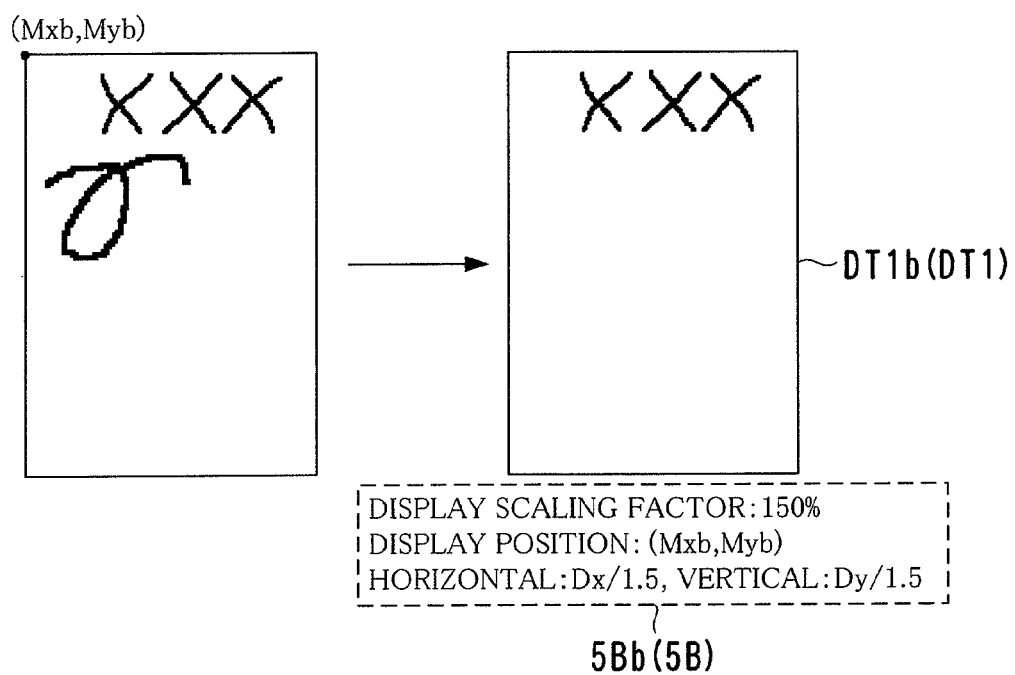

FIG. 11 is a diagram illustrating an example of the configuration of the electronic paper scan processing portion 102; FIG. 12 is a sequence diagram depicting an example of the process steps of the individual apparatuses for a case where an added content is registered; and FIGS. 13A and 13B are diagrams illustrating examples of an added content and display conditions data 5B.

A user can write a note or a comment in an original document displayed on the electronic paper 3 with a water-based ink pen. The user can register, as an added content, the note or the comment written therein in the document management server 2.

The process for registering an added content in the document management server 2 is performed mainly by the electronic paper scan processing portion 102 (see FIG. 3) of the image forming apparatus 1, the added content registration processing portion 201 (see FIG. 5) of the document management server 2, the display termination instructing portion 303 of the electronic paper 3, and the like.

Referring to FIG. 11, the electronic paper scan processing portion 102 is configured of a scan preparation request processing portion 121, a display information obtaining portion 122, a display off information obtaining portion 123, an added content obtaining portion 124, an added content transmission portion 125, a display information transmission portion 126, and the like. The individual portions of the electronic paper scan processing portion 102 perform processes according to the steps shown in FIG. 12.

After logging onto the image forming apparatus 1 (#701 of FIG. 12), a user performs predetermined operation to change the mode of the image forming apparatus 1 to an electronic paper scan mode, and sets the electronic paper 3 in the image reader 10*j*. The user, then, presses a start key (#702).

Responding to this operation, the scan preparation request processing portion 121 sends a predetermine command to the electronic paper 3; thereby the electronic paper 3 is requested to prepare for a scan process (#703).

With the electronic paper 3, when the command is received from the image forming apparatus 1 (#711), the display information conveying portion 301 informs the image forming apparatus 1 of display conditions of the original document currently displayed on the electronic paper 3 and the original document ID thereof. The display termination instructing portion 303 instructs the drive control portion 30*f* (see FIG. 6) to finish displaying the original document, and the drive control portion 30*f* finishes displaying the original document (#712). In short, the original document is not displayed on the electronic paper 3. When displaying the original document is finished (#713), the image forming apparatus 1 is informed of the fact (#714).

With the image forming apparatus 1, the display information obtaining portion 122 and the display off information obtaining portion 123 obtain the display conditions and the information indicating that displaying the original document is finished, respectively, both of which are sent from the electronic paper 3 (#704 and #705).

The added content obtaining portion 124 controls the image reader 10*j* to scan the electronic paper 3 set to the image reader 10*j* and obtain image data of the added content (#706). Thereby, image data is generated which does not contain the original document but only contains the added content. Such image data generated is hereinafter referred to as "image data DT1". The image data DT1 is given a unique image ID to distinguish the image data DT1 from other image data.

The display information transmission portion 126 associates display conditions data 5B indicating the informed display conditions with the informed original document ID, and sends the display conditions data 5B to the document management server 2 (#708). The added content transmission portion 125 associates the generated image data DT1 with the informed original document ID and the user ID of the log-on user, and sends the image data DT1 to the document management server 2 (#709).

With the document management server 2, when the display conditions data 5B and the image data DT1 are sent from the image forming apparatus 1 (#721 and #722), a process for registering (saving) the display conditions data 5B and the image data DT1 is performed in the following manner (#723).

The added content registration processing portion 201 issues a unique ID common to the display conditions data 5B and the image data DT1. As described later, the image data DT1 is used as a so-called layer image to be overlaid on the original document. Accordingly, the ID issued by the added content registration processing portion 201 is hereinafter referred to as a "layer ID".

The added content registration processing portion 201 maintains the interrelationship between the image data DT1, the original document ID, and the user ID, associates the image data DT1 further with the layer ID issued, and stores the same in the image data storage portion 208. Further, the added content registration processing portion 201 maintains the interrelationship between the display conditions data 5B and the original document ID, associates the display conditions data 5B further with the layer ID issued, and stores the same in the added content database 209.

For example, if the process discussed above is performed on the electronic paper 3 displaying, at 200% scaling factor, an area starting from the coordinates (Mxa, Mya) of the original document and ending at the position obtained by moving from the start point in the horizontal direction by (Dx/2) pixels and in the vertical direction by (Dy/2) pixels, then image data DT1a and display conditions data 5Ba as shown in FIG. 13A are obtained as the image data DT1 and the display conditions data 5B, respectively.

Alternatively, if the process discussed above is performed on the electronic paper 3 displaying, at 150% scaling factor, an area starting from the coordinates (Mxb, Myb) of the original document and ending at the position obtained by moving from the start point in the horizontal direction by (Dx/1.5) pixels and in the vertical direction by (Dy/1.5) pixels, then image data DT1b and display conditions data 5Bb as shown in FIG. 13B are obtained as the image data DT1 and the display conditions data 5B, respectively.

[Process for Overlaying an Added Content on an Original Document and Copying the Resultant]

Figure 14:
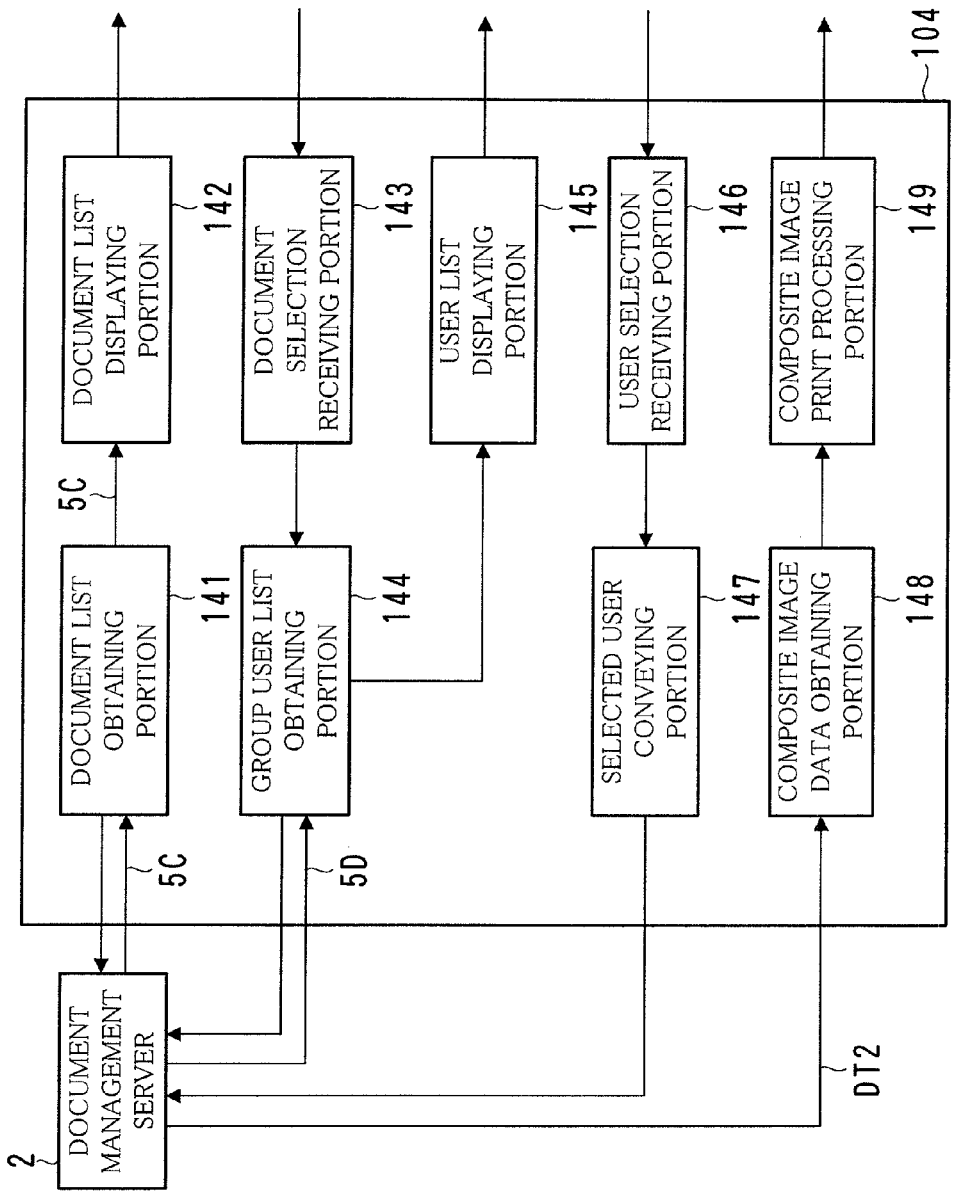
FIG. 14 is a diagram illustrating an example of the configuration of a server document print processing portion.
Figure 15:
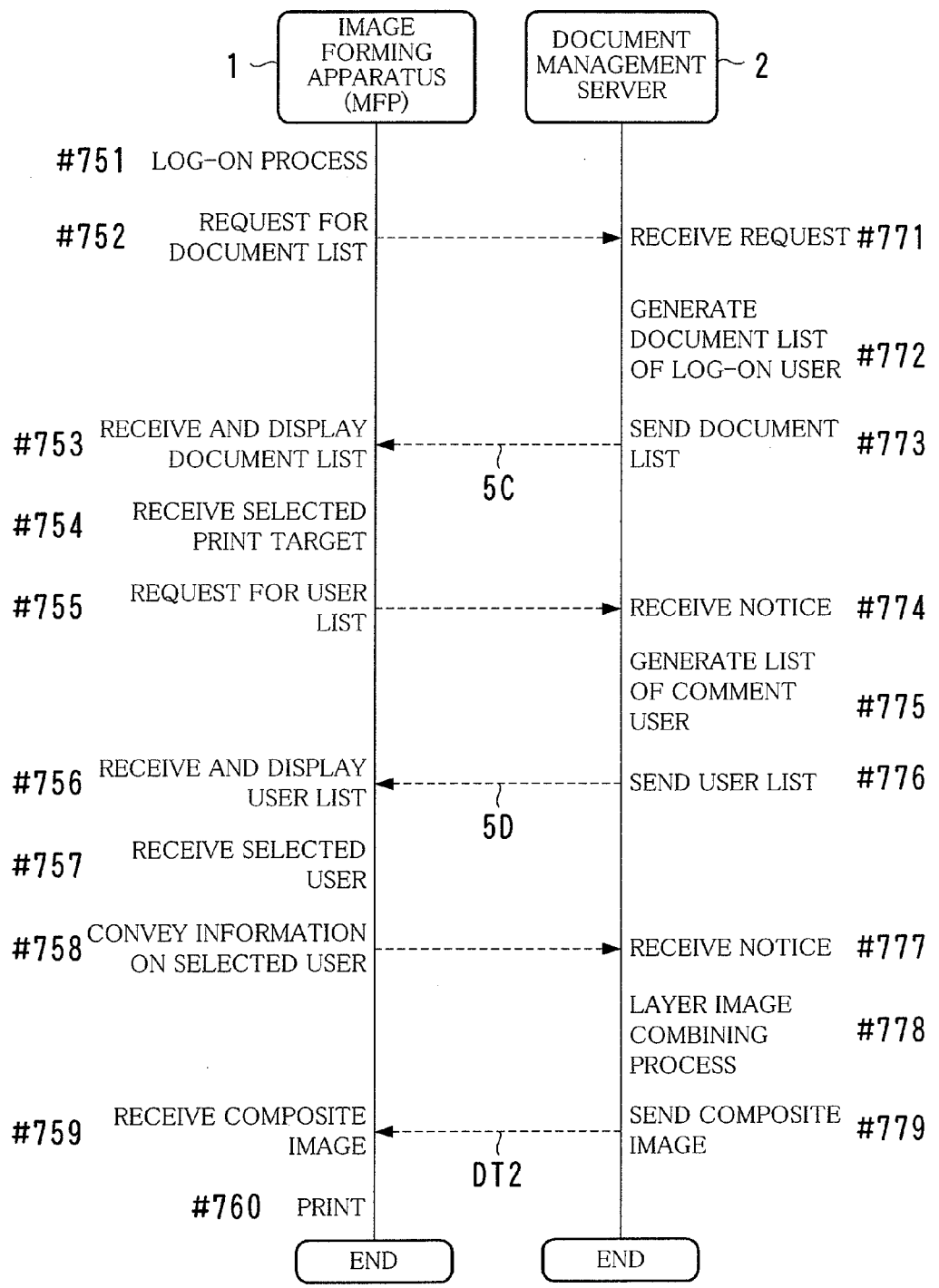
FIG. 15 is a sequence diagram depicting an example of the process steps of individual apparatuses for a case where a composite image is printed.
Figure 16:
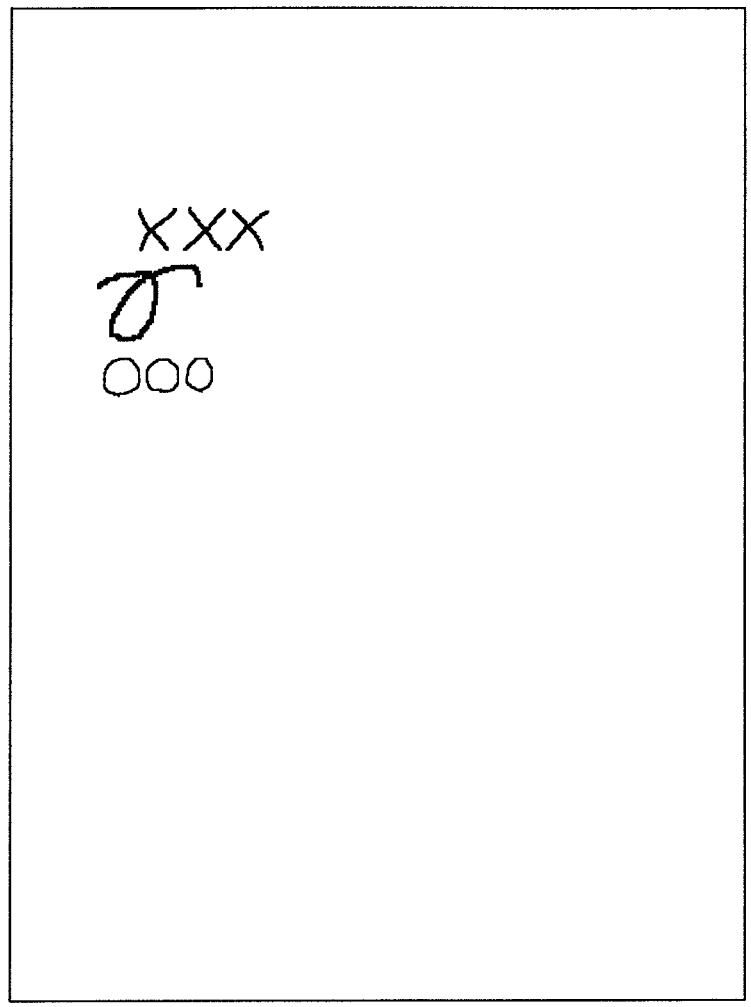
FIG. 16 is a diagram illustrating an example of a composite image.

FIG. 14 is a diagram illustrating an example of the configuration of the server document print processing portion 104; FIG. 15 is a sequence diagram depicting an example of the process steps of individual apparatuses for a case where a composite image is printed; and FIG. 16 is a diagram illustrating an example of a composite image.

A user can cause the image forming apparatus 1 to overlay an added content of each user on an original document and print the resultant.

The process for overlaying an added content on the original document and printing the resultant is performed mainly by the electronic paper copy processing portion 103 (see FIG. 3) of the image forming apparatus 1, the document list supply processing portion 202, the image data transmission processing portion 203, the user list supply processing portion 204, the image combining processing portion 205 of the document management server 2, and the like.

Referring to FIG. 14, the server document print processing portion 104 is configured of a document list obtaining portion 141, a document list displaying portion 142, a document selection receiving portion 143, a group user list obtaining portion 144, a user list displaying portion 145, a user selection receiving portion 146, a selected user conveying portion 147, a composite image data obtaining portion 148, a composite image print processing portion 149, and the like. The individual portions perform processes according to the steps shown in FIG. 15.

After a user logs onto the image forming apparatus 1 (#751 of FIG. 15), the user enters a predetermined command. Responding to this operation, the document list obtaining portion 141 requests the document management server 2 for a list of original documents (#752). At this time, the document list obtaining portion 141 informs the document management server 2 of the user ID of the user who has logged onto the image forming apparatus 1, i.e., the log-on user.

With the document management server 2, when the request is received from the image forming apparatus 1 (#771), the document list supply processing portion 202 searches for image data DT0 with which the informed user ID is associated as an authorized user ID in the image data storage portion 208. Then, the document list supply processing portion 202 generates document list data 5C containing the original document ID of the image data DT0 found by the search (#772) and sends the generated document list data 5C to the image forming apparatus 1 (#773).

With the image forming apparatus 1, when document list obtaining portion 141 receives the document list data 5C, the document list displaying portion 142 displays, on the touchscreen 10e, a list of original document IDs included in the document list data 5C (#753).

The user selects an original document ID of an original document to be printed from among the displayed list of original document IDs. When the document selection receiving portion 143 receives the selected original document ID (#754), the group user list obtaining portion 144 requests the document management server 2 for a list of users who have written an added content on the original document corresponding to the original document ID (#755). At this time, the group user list obtaining portion 144 informs the document management server 2 of the selected original document ID.

With the document management server 2, the user list supply processing portion 204 searches for image data DT1 associated with the informed original document ID, generates user list data 5D containing user IDs associated with the individual pieces of image data DT1 found by the search (#775), and sends the generated user list data 5D to the image forming apparatus 1 (#776).

With the image forming apparatus 1, when the group user list obtaining portion 144 obtains the user list data 5D, the user list displaying portion 145 displays, on the touchscreen 10e, a list of the user IDs contained in the user list data 5D (#756).

Upon viewing the list of the user IDs, the log-on user selects a user ID of a user who has written an added content that the log-on user intends to overlay on the original document. The log-on user may select a plurality of user IDs. When the user selection receiving portion 146 receives the user ID selected (#757), the selected user conveying portion 147 conveys the selected user ID to the document management server 2 (#758).

With the document management server 2, the image combining processing portion 205 performs a process for combining the added content with the original document in the following manner (#778).

The image combining processing portion 205 reads out, from the image data storage portion 208, the image data DT0 corresponding to the original document ID received in Step #774 and the image data DT1 corresponding to the user ID received in Step #758. The image combining processing portion 205 further reads out, from the added content database 209, the display conditions data 5 associated with the layer ID of the image data DT1 read out.

The image combining processing portion 205 overlays an added content reproduced based on the read-out image data DT1 on an original document reproduced based on the readout image data DT0. To be specific, the added content is enlarged at a scaling factor specified in the display conditions data 5B, and the enlarged added content is overlaid on the original document at a position specified in the display conditions data 5B. In the case where a plurality of sets of the image data DT1 and the display conditions data 5B are read out, the image combining processing portion 205 overlays, in due order, added contents reproduced based on the individual pieces of image data DT1 on original documents reproduced based on the individual pieces of image data DT0.

In this way, the added content is overlaid on the original document. Hereinafter, the original document on which the added content has been overlaid is referred to as a "composite image".

The composite image data transmission processing portion 206 sends, to the image forming apparatus 1, composite image data DT2 that is image data of the composite image generated by the image combining processing portion 205 (#779).

With the image forming apparatus 1, the composite image data obtaining portion 148 obtains the composite image data DT2 sent from the document management server 2 (#759). The composite image print processing portion 149 performs a process for printing the composite image onto paper based on the obtained composite image data DT2 (#760).

According to the processes discussed above, the added content shown in FIG. 13A and the added content shown in FIG. 13B are overlaid on the original document shown in FIG. 10A, so that the composite image shown in FIG. 16 is generated.

In the foregoing example, the image combining processing portion 205 adjusts the position and the size of an added content when the image combining processing portion 205 overlays the added content on the original document. Instead, however, the added content registration processing portion 201 adjusts the position and the size of an added content in advance. Stated differently, after such adjustment is made, image data DT1 of an added content may be registered in the image data storage portion 208.

[Process for Copying a Document Displayed on the Electronic Paper onto Paper]

Figure 17:
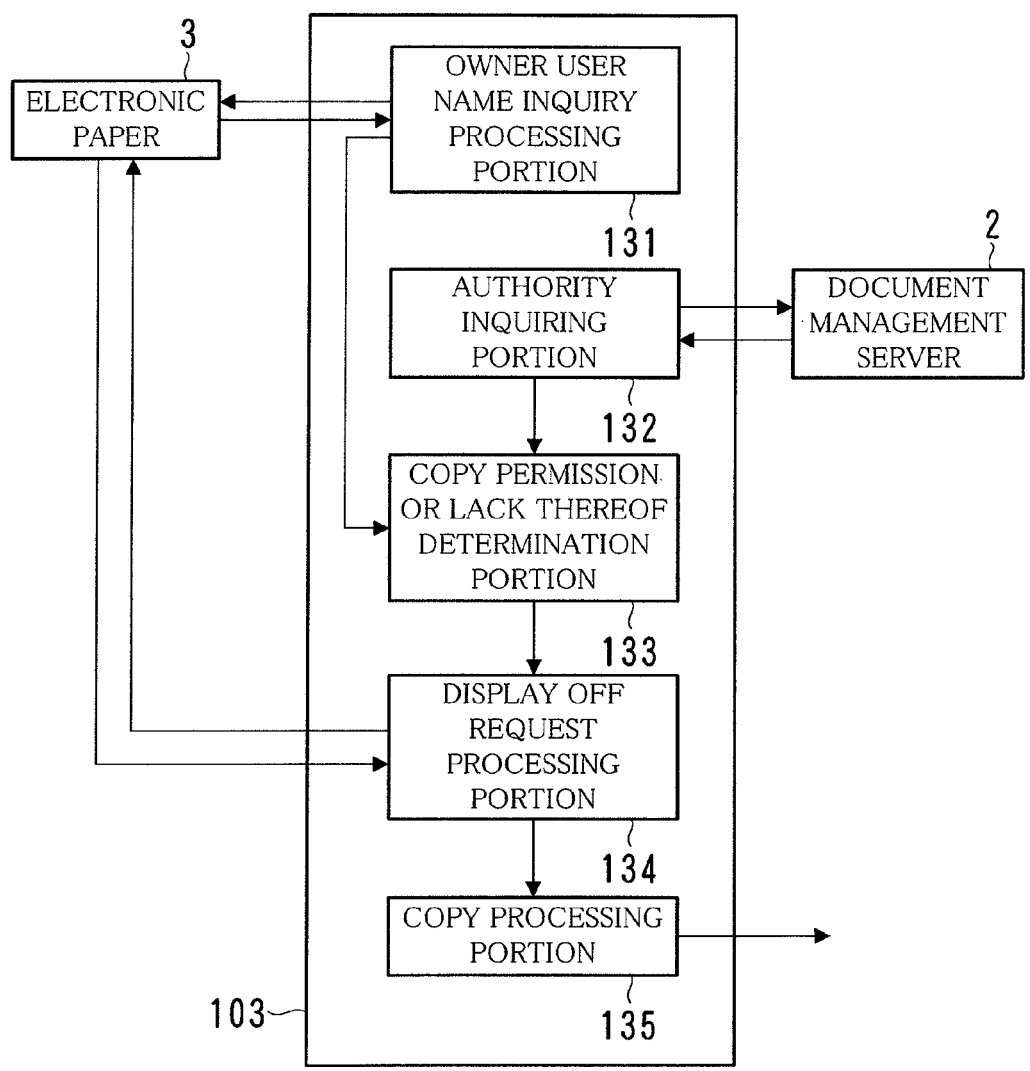
FIG. 17 is a diagram illustrating an example of the configuration of an electronic paper copy processing portion.
Figure 18:
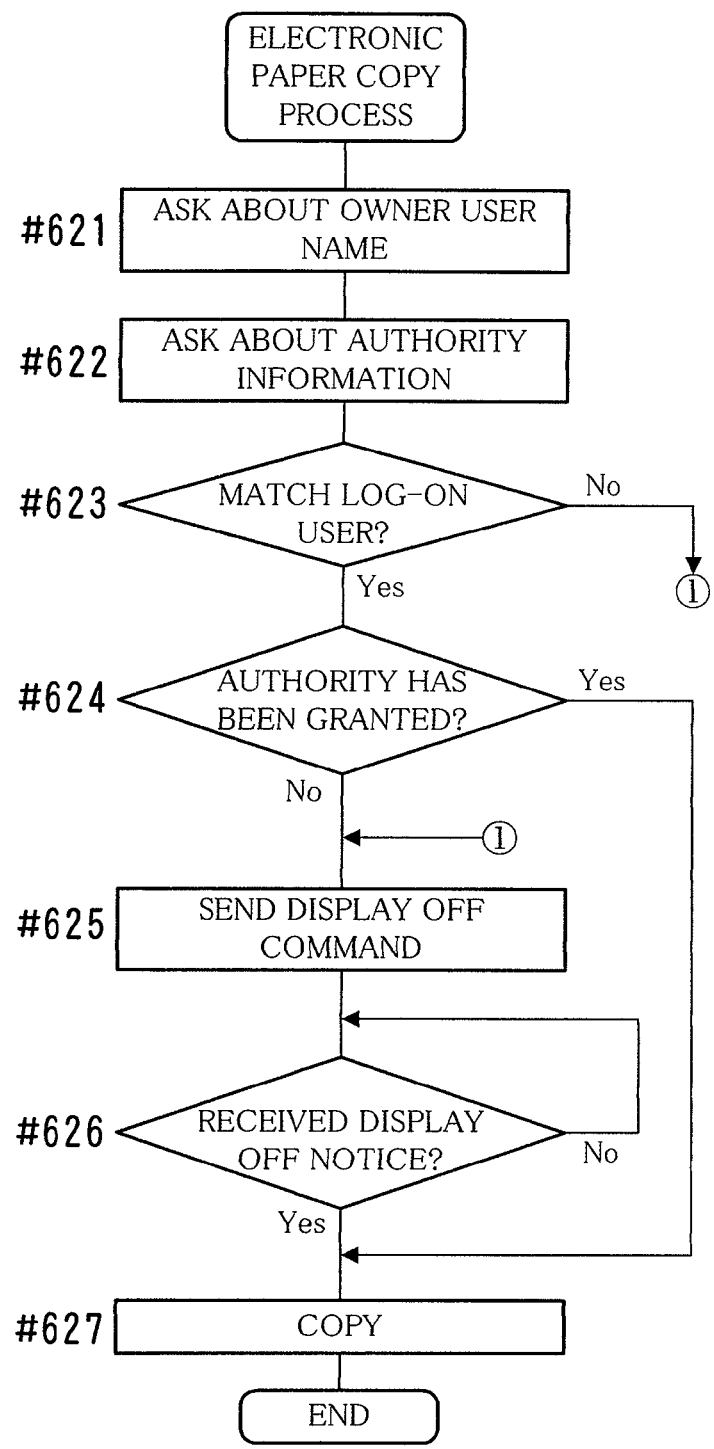
FIG. 18 is a flowchart depicting an example of the flow of an electronic paper copy process.

FIG. 17 is a diagram illustrating an example of the configuration of the electronic paper copy processing portion 103, and FIG. 18 is a flowchart depicting an example of the flow of an electronic paper copy process.

A user can cause the image forming apparatus 1 to copy an original document displayed on the electronic paper 3 onto paper.

The process for copying is performed mainly by the electronic paper copy processing portion 103 (see FIG. 3) of the image forming apparatus 1, the authority replying portion 207 (see FIG. 5) of the document management server 2, the display termination instructing portion 303 and the owner user replying portion 304 (see FIG. 7) of the electronic paper 3, and the like.

Referring to FIG. 17, the electronic paper copy processing portion 103 is configured of an owner user name inquiry processing portion 131, an authority inquiring portion 132, a copy permission or lack thereof determination portion 133, a display off request processing portion 134, a copy processing portion 135, and the like. The individual portions of the electronic paper copy processing portion 103 perform processes according to the steps shown in FIG. 18.

After a user logs onto the image forming apparatus 1, the user displays an original document on the electronic paper 3. The method for displaying the original document is as described earlier with reference to FIG. 9, and the like. The user, then, sets the electronic paper 3 on which the original document is displayed to the image reader 10j and presses a start key.

Responding to this operation, the owner user name inquiry processing portion 131 asks the electronic paper 3 about a user ID of an owner of the electronic paper 3 and an original document ID of the original document currently displayed on the electronic paper 3 (#621 of FIG. 18).

When receiving the inquiry from the image forming apparatus 1, the owner user replying portion 304 of the electronic paper 3 conveys the user ID stored in the display data memory 30d (see FIG. 6) to the image forming apparatus 1.

The authority inquiring portion 132 asks the document management server 2 about a user ID of a user authorized to use the original document currently displayed on the electronic paper 3, i.e., an authorized user ID (#622). At this time, the authority inquiring portion 132 informs the document management server 2 of the original document ID obtained in response to Step #621.

The authority replying portion 207 of the document management server 2 conveys an authorized user ID associated with image data DT0 of the informed original document ID to the image forming apparatus 1.

With the image forming apparatus 1, the copy permission or lack thereof determination portion 133 permits the log-on user to copy the original document if the user ID conveyed by the electronic paper 3 matches the user ID of the log-on user (Yes in #623), and at the same time, if the user ID of the log-on user is included in the authorized user ID conveyed by the document management server 2 (Yes in #624). Then, the copy processing portion 135 causes the image forming portion 10m to perform a copy (scanning and printing) process with the original document displayed.

On the other hand, the copy permission or lack thereof determination portion 133 denies the log-on user to copy the original document if the user ID conveyed by the electronic paper 3 does not match the user ID of the log-on user (No in #623), or, if the user ID of the log-on user is not included in the authorized user ID conveyed by the document management server 2 (No in #624). The display off request processing portion 134 then requests the electronic paper 3 to finish displaying the original document (#625).

Responding to the request, the display termination instructing portion 303 of the electronic paper 3 instructs the drive control portion 30f (see FIG. 6) to finish displaying the original document. When displaying the original document is finished, the image forming apparatus 1 is informed of the fact.

With the image forming apparatus 1, when the information is received from the electronic paper 3 (Yes in #626), the copy processing portion 135 causes the image forming portion 10m to copy the indication on the electronic paper 3. Since the original document is not displayed on the electronic paper 3, the original document is not copied onto paper.

The foregoing description focuses on the example in which the original document is copied. Processes similar to those above are performed for a case where a composite image is copied. In such a case, the image forming apparatus 1 preferably asks the document management server 2 about an original document based on which a composite image has been generated.

Figure 19:
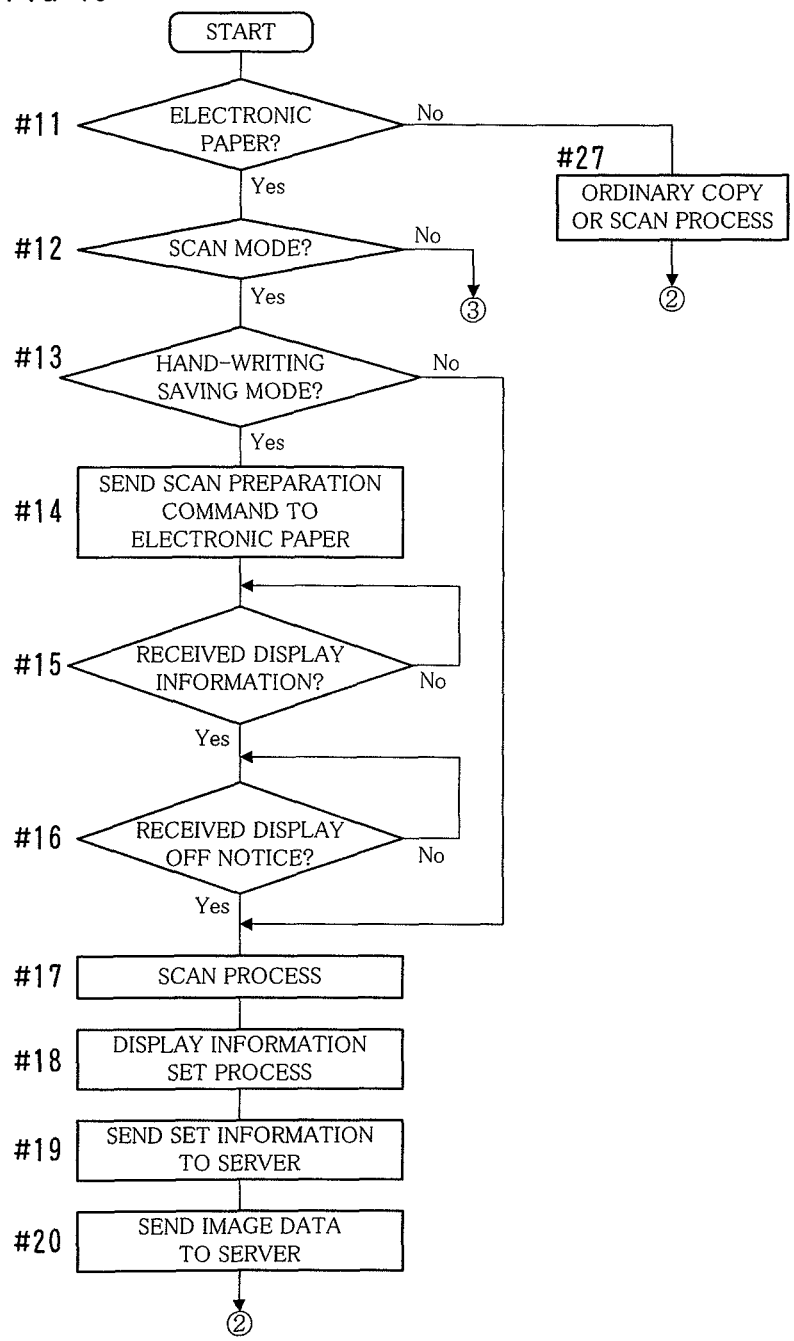
FIG. 19 is a flowchart depicting an example of the overall processing flow of an image forming apparatus.
Figure 20:
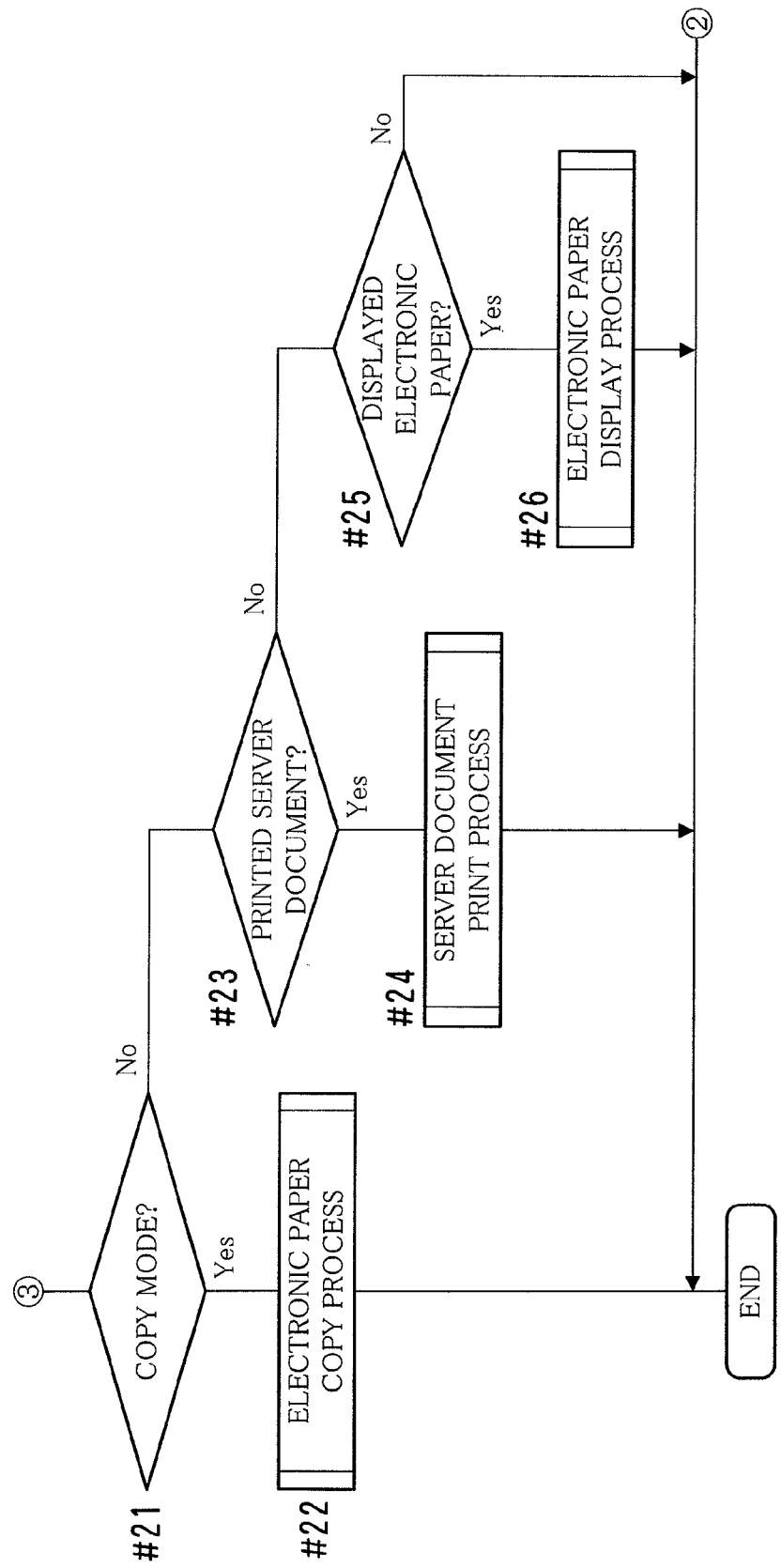
FIG. 20 is a flowchart depicting an example of the overall processing flow of an image forming apparatus.
Figure 21:
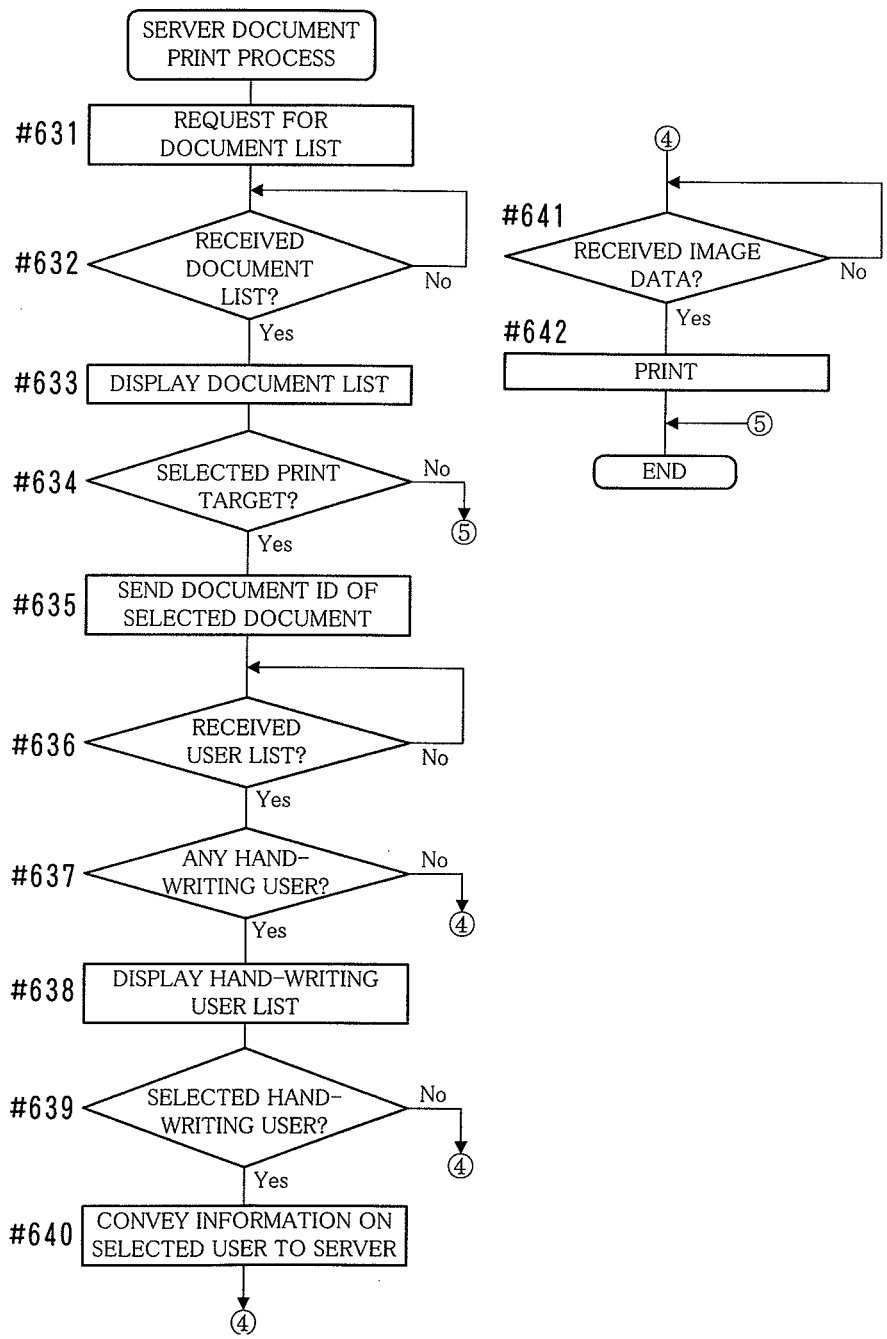
FIG. 21 is a flowchart depicting an example of the flow of a server document print process.
Figure 22:
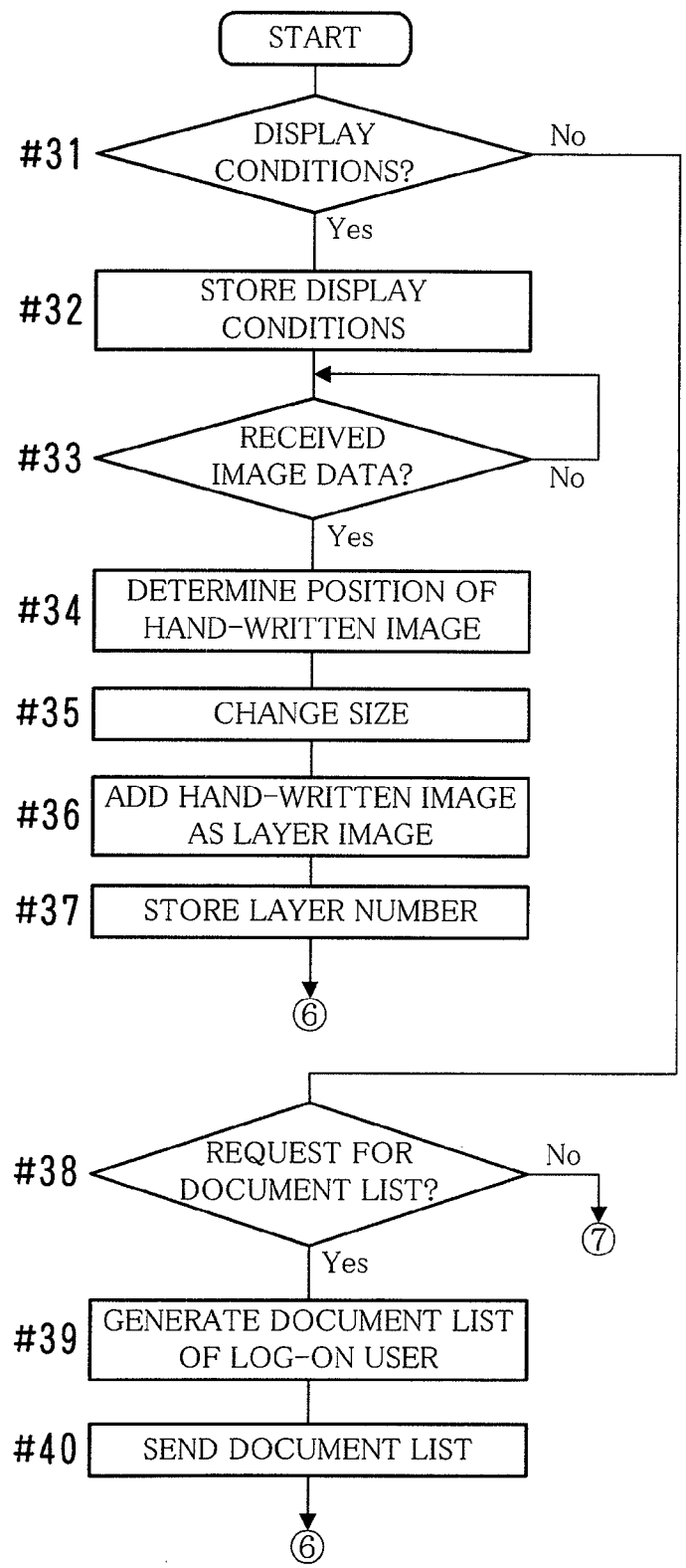
FIG. 22 is a flowchart depicting an example of the overall processing flow of a document management server.
Figure 23:
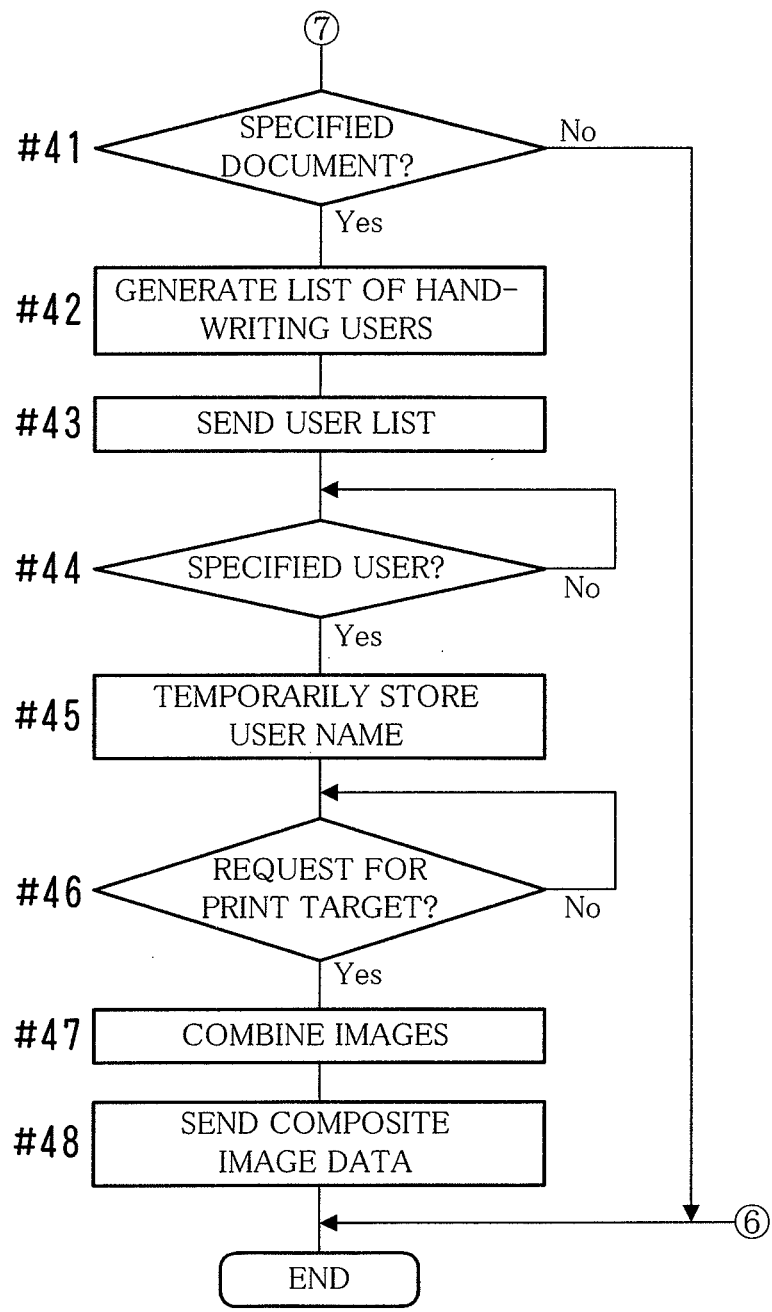
FIG. 23 is a flowchart depicting an example of the overall processing flow of a document management server.
Figure 24:
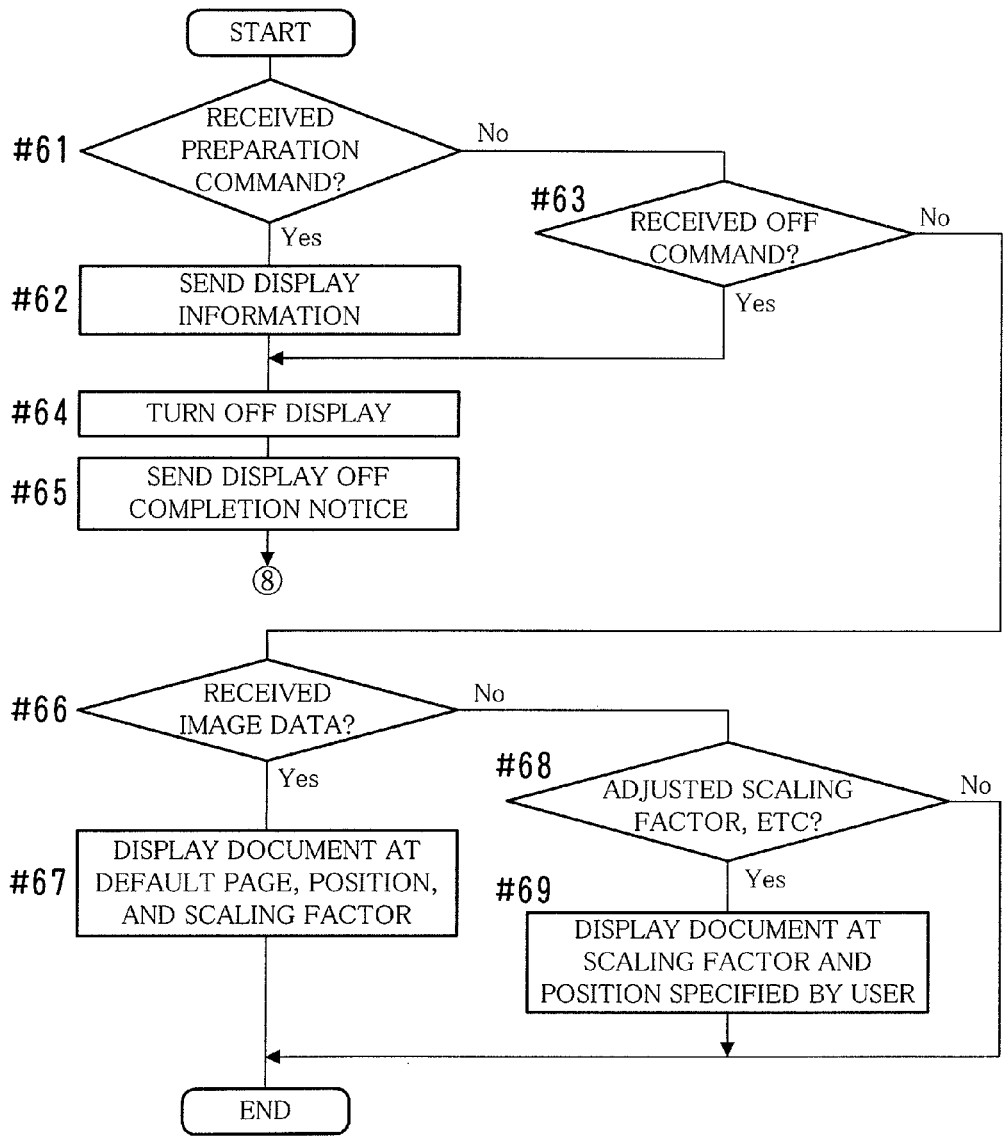
FIG. 24 is a flowchart depicting an example of the overall processing flow of electronic paper.

FIGS. 19 and 20 are flowcharts depicting an example of the overall processing flow of the image forming apparatus 1; FIG. 21 is a flowchart depicting an example of the flow of a server document print process; FIGS. 22 and 23 are flowcharts depicting an example of the overall processing flow of the document management server 2; and FIG. 24 is a flowchart depicting an example of the overall processing flow of the electronic paper 3.

The following is a description of the overall process steps of the image forming apparatus 1, the document management server 2, and the electronic paper 3, with reference to the flowcharts of FIGS. 19 to 24.

During a period from when a user logs onto the image forming apparatus 1 and to when the user logs out the same, the image forming apparatus 1 performs the following processes in accordance with operation performed by the user.

Referring to FIGS. 19 and 20, when electronic paper 3 is set (Yes in #11) and a command to display an original document on the electronic paper 3 is received (No in #12, No in #21, No in #23, and Yes in #25), the image forming apparatus 1 performs a process for displaying the original document on the electronic paper 3 (#26). The steps of this process are as described earlier with reference to FIG. 9. A user who has logged onto the image forming apparatus 1, i.e., a log-on user, can write an added content by hand with a water-based ink pen in the electronic paper 3.

Alternatively, when the electronic paper 3 is set (Yes in #11), a scan mode is specified (Yes in #12), and a command to save an added content is given (Yes in #13), the image forming apparatus 1 requests the electronic paper 3 to prepare for a scan process (#14).

When the image forming apparatus 1 receives display conditions of the original document displayed on the electronic paper 3 (Yes in #15), and receives the information indicating that displaying the original document is finished (Yes in #16), the image forming apparatus 1 scans the electronic paper 3 (#17). Thereby, image data of the added content, or, in other words, image data DT1, is obtained.

The image forming apparatus 1, then, issues a layer ID, and generates display conditions data 5B indicating the display conditions received from the electronic paper 3 (#18). The image forming apparatus 1, then, associates the display conditions data 5B and the image data DT1 with the layer ID, and sends the same to the document management server 2 (#19 and #20).

Alternatively, when the electronic paper 3 is set (Yes in #11), and a command to print an added content and an original document saved in the document management server 2 is received (No in #12, No in #21, and Yes in #23), the image forming apparatus 1 performs a process for overlaying the added content on the original document and prints the resultant (#24). The steps of this process are as described earlier with reference to FIG. 21.

Referring to FIG. 21, the image forming apparatus 1 requests the document management server 2 for a list of original documents (#631). When receiving document list data 5C from the document management server 2 (Yes in #632), the image forming apparatus 1 displays the list of such documents for the log-on user (#633).

When the log-on user selects an original document (Yes in #634), the image forming apparatus 1 informs the document management server 2 of an original document ID of the selected original document (#635).

When the image forming apparatus 1 receives, from the document management server 2, user list data 5D indicating users who have written a note or a comment on the selected original document (Yes in #636, and Yes in #637), the image forming apparatus 1 displays the list of such users for the log-on user (#638).

If any of users who have written a note or a comment is selected (Yes in #639), then the image forming apparatus 1 informs the document management server 2 which user has been selected (#640).

When receiving, from the document management server 2, composite image data DT2 of a composite image in which an added content written by the selected user is overlaid on the original document (Yes in #641), the image forming apparatus 1 prints the composite image onto paper (#632).

Referring back to FIGS. 19 and 20, when the electronic paper 3 is set (Yes in #11), and a command to copy a document on the electronic paper 3 is received (No in #12, and Yes in #21), the image forming apparatus 1 performs a process for copying the document displayed on the electronic paper 3 onto paper (#22). The steps of this process are as described earlier with reference to FIG. 18.

Alternatively, when the electronic paper 3 is not set (No in #11), the image forming apparatus 1 performs an ordinary process in accordance with operation performed by the user (#27).

The document management server 2 performs the following processes appropriately in accordance with instructions from the image forming apparatus 1, and the like.

Referring to FIGS. 22 and 23, when receiving display conditions data 5B from the image forming apparatus 1 (Yes in #31), the document management server 2 stores the display conditions data 5B into the added content database 209 (#32). When further receiving image data DT1 making a pair with the display conditions data 5B (Yes in #33), the document management server 2 stores the image data DT1 into the image data storage portion 208 (#36). At this time, the document management server 2 may update the image data DT1 in such a manner that the position and the size of an added content are adjusted in accordance with the display conditions indicated in the display conditions data 5B (#34 and #35). The image forming apparatus 1 adds an identical layer ID to both the image data DT1 and the display conditions data 5B, and stores the image data DT1 and the display conditions data 5B (#37).

Alternatively, when the document management server 2 receives a request for a document list together with information on the user ID from the image forming apparatus 1 (Yes in #38), the document management server 2 generates a list of original document IDs of image data Dt0 associated with the user ID (#39), and sends the list generated to the image forming apparatus 1 (#40).

Alternatively, when the document management server 2 receives information on an original document ID from the image forming apparatus 1 (Yes in #41), the document management server 2 generates user list data 5D indicating user IDs of users who have written an added content on an original document corresponding to the original document ID (#42), and sends the user list data 5D to the image forming apparatus 1 (#43).

When receiving a specified user ID from the image forming apparatus 1 (Yes in #44), the document management server 2 overlays, on the original document corresponding to the original document ID received in Step #41, the added content written by the user corresponding to the received user ID in the original document; thereby to create composite image data DT2 of a composite image (#47).

The document management server 2, then, sends the composite image data DT2 created to the image forming apparatus 1 (#48). Another arrangement is possible in which the document management server 2 creates and sends composite image data DT2 in response to a request made by the image forming apparatus 1 (Yes in #46).

The electronic paper 3 performs the following processes appropriately in accordance with instructions from the image forming apparatus 1, and the like.

Referring to FIG. 24, when receiving a command to prepare for a scan process from the image forming apparatus 1 (Yes in #61), the electronic paper 3 sends, to the image forming apparatus 1, conditions for displaying the original document currently displayed on the electronic paper 3 (#62). The electronic paper 3 finishes displaying the original document thereon (#64), and informs the image forming apparatus 1 that displaying the original document is finished (#65).

Alternatively, when receiving a command to finish displaying an original document from the image forming apparatus 1 (Yen in #63), the electronic paper 3 finishes displaying the original document thereon (#64), and informs the image forming apparatus 1 that displaying the original document is finished (#65)

Alternatively, when receiving image data DT0 from the image forming apparatus 1 (Yes in #66), the electronic paper 3 displays an original document in the default format (#67). Thereafter, in response to operation for display performed by the user (Yes in #68), the electronic paper 3 changes the position and the size of display of the original document in accordance with the operation by the user and displays the original document (#69).

The embodiment discussed above makes it possible to improve the convenience of using image data DT1 of an added content written on the electronic paper 3 as compared with conventional technologies.

FIG. 25 is a diagram illustrating an example of a table storing data for added contents. The embodiment describes an example in which one original document contains only one page. The embodiment, however, is also applicable to a case in which one original document contains a plurality of pages. In such a case, the same process as that applied to an original document in this embodiment is desirably performed on a one-page image. Note, however, that data on each page contained in one original document is preferably managed by using a table for the original document as shown in FIG. 25.

In this embodiment, an added content selected by a user is overlaid on an original document, and the resultant is printed onto paper. Instead, however, it is possible to print only an added content onto paper.

Although only a single type of user authority for an original document is prepared in the embodiment, a plurality of types of user authorities may be prepared. For example, two types of user authorities such as an authority to browse an original document and an authority to print an original document may be prepared. In such a case, the image forming apparatus 1 displays an original document on the electronic paper 3 only when a command to display the original document is issued by a user granted the authority to browse. Likewise, the image forming apparatus 1 prints an original document onto paper only when a command to print the original document is issued by a user granted the authority to print.

Another configuration is possible in which the image forming apparatus 1 regards, as an added content to be overlaid on an original document, only either an added content written by a user who belongs to the same group as another user who has given a command, or an added content written by a user himself/herself. A variety of methods for grouping users are used. For example, grouping is performed in such a manner that users given an identical authority for an original document belong to one group. Alternatively, users of the same section may belong to one group.

In the embodiments discussed above, the overall configurations of the network system NS, the image forming apparatus 1, the document management server 2, the electronic paper 3, the configurations of various portions thereof, the content to be processed, the processing order, the configuration of the data, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus having a scanner to scan a paper placed thereon and a function to perform communication with electronic paper having a display area, the image processing apparatus comprising:
  a processor configured to:
    obtain, from the electronic paper, display conditions data indicating which part of an original document image corresponds to a displayed image that is an image displayed on the display area of the electronic paper;
    send, to the electronic paper, a command to request the electronic paper to finish displaying the displayed image;
    obtain write image data that is image data of a write image corresponding to an image written by hand on the display area of the electronic paper, by scanning only the write image written on the display area of the electronic paper with the scanner after finishing displaying the displayed image by the command; and
    store original document image data that is image data of the original document image, the display conditions data, and the write image data obtained by scanning in a storage portion, the displayed image data, the display conditions data, and the write image data being associated with one another; and
    generate a composite image in which the write image is overlaid on a part indicated in the display conditions data of the original document image based on the original document image data, the write image data, and the display conditions data.

2. The image processing apparatus according to claim 1, wherein the processor is further configured to:
  obtain, as the display conditions data, data indicating an enlargement factor of the original document image displayed on the electronic paper, and
  generate the composite image by adjusting the write image to have a size of a reciprocal multiple of the enlargement factor and overlaying the write image thus adjusted on the part indicated in the display conditions data of the original document image.

3. The image processing apparatus according to claim 1, wherein
  a plurality of the write images differing from one another are written on the electronic paper at different periods of time, and
  the processor is further configured to:
    obtain a plurality of the write image data of the plurality of the write images for each of the periods of time,
    store the plurality of the write image data of the plurality of the write images for each of the periods of time, and
    generate the composite image by overlaying at least one of the plurality of the write images on the displayed image.

4. The image processing apparatus according to claim 3, wherein each of the plurality of the write images is written while the electronic paper displays, thereon, parts of the displayed image differing from one another, the processor is further configured to:
obtain the display conditions data for the original document image displayed on the electronic paper at a time when the write image is written, and
send the command every time the write image is written.

5. The image processing apparatus according to claim 3, wherein the processor is further configured to generate the composite image by overlaying, on the part indicated in the display conditions data of the original document image, the write image written by a user, if the user belongs to a specific group.

6. A method for managing image data, the method comprising:
a first step of obtaining display conditions data, from an electronic paper having a display area, the display conditions data indicating which part of an original document image corresponds to a displayed image that is an image displayed on the display area of the electronic paper;
a second step of controlling the electronic paper to finish displaying the displayed image;
a third step of obtaining write image data that is image data of a write image corresponding to an image written by hand on the display area of the electronic paper, by scanning only the write image written on the display area of the electronic paper with a scanner after finishing displaying the displayed image in the second step;
a fourth step of controlling a storage portion to store, therein, original document image data that is image data of the original document image, the display conditions data, and the write image data obtained by scanning in the storage portion, the original document image data, the display conditions data, and the write image data being associated with one another; and
a fifth step of generating a composite image by overlaying the write image on a part indicated in the display conditions data of the original document image based on the original document image data, the write image data, and the display conditions data.

7. The method according to claim 6, wherein
the first step includes obtaining, as the display conditions data, data indicating an enlargement factor of the original document image displayed on the electronic paper, and
the fifth step includes generating the composite image by adjusting the write image to have a size of a reciprocal multiple of the enlargement factor and overlaying the write image thus adjusted on the part indicated in the display conditions data of the original document image.

8. The method according to claim 6, wherein
a plurality of the write images differing from one another are written on the electronic paper at different periods of time,
the third step includes a plurality of the write image data of the plurality of the write images for each of the periods of time,
the fourth step includes controlling the storage portion to store, therein, the plurality of the write image data of the plurality of the write images for each of the periods of time, and
the fifth step includes generating the composite image by overlaying at least one of the plurality of the write images on the displayed image.

9. The method according to claim 8, wherein
each of the plurality of the write images is written while the electronic paper displays, thereon, parts of the displayed image differing from one another,
the first step includes obtaining the display conditions data for the original document image displayed on the electronic paper at a time when the write image is written, and
the second step includes sending the command every time the write image is written.

10. The method according to claim 8, wherein the fifth step includes generating the composite image by overlaying, on the part indicated in the display conditions data of the original document image, the write image written by a user, if the user belongs to a specific group.

11. A computer-readable non-transitory storage medium storing thereon a computer program used in an image processing apparatus having a scanner scanning a paper placed thereon and a function to perform communication with electronic paper having a display area, the computer program causing the image processing apparatus to perform:
a first process of obtaining display conditions data, from the electronic paper, the display conditions data indicating which part of an original document image corresponds to a displayed image that is an image displayed on the display area of the electronic paper;
a second process of controlling the electronic paper to finish displaying the displayed image;
a third process of obtaining write image data that is image data of a write image corresponding to an image written by hand on the display area of the electronic paper, by scanning only the write image written on the display area of the electronic paper with the scanner after finishing displaying the displayed image in the second process;
a fourth process of controlling a storage portion to store, therein, original document image data that is image data of the original document image, the display conditions data, and the write image data obtained by scanning in the storage portion, the original document image data, the display conditions data, and the write image data being associated with one another; and
a fifth step of generating a composite image by overlaying the write image on a part indicated in the display conditions data of the original document image based on the original document image data, the write image data, and the display conditions data.

12. The computer-readable non-transitory storage medium according to claim 11, wherein
the first process includes obtaining, as the display conditions data, data indicating an enlargement factor of the original document image displayed on the electronic paper, and
the fifth process includes generating the composite image by adjusting the write image to have a size of a reciprocal multiple of the enlargement factor and overlaying the write image thus adjusted on the part indicated in the display conditions data of the original document image.

13. The computer-readable non-transitory storage medium according to claim 11, wherein
a plurality of the write images differing from one another are written on the electronic paper at different periods of time,
the third process includes obtaining a plurality of the write image data of the plurality of the write images for each of the periods of time, the fourth process includes controlling the storage portion to store, therein, the plurality of the write image data of the plurality of the write images for each of the periods of time, and the fifth process includes generating the composite image by overlaying at least one of the plurality of the write images on the displayed image.

14. The computer-readable non-transitory storage medium according to claim 13, wherein each of the plurality of the write images is written while the electronic paper displays, thereon, parts of the displayed image differing from one another, the first process includes obtaining the display conditions data for the original document image displayed on the electronic paper at a time when the write image is written, and the second process includes sending the command every time the write image is written.

15. The computer-readable non-transitory storage medium according to claim 13, wherein the fifth process includes generating the composite image by overlaying, on the part indicated in the display conditions data of the original document image, the write image written by a user, if the user belongs to a specific group.

* * * * *